US010192268B2

(12) United States Patent
Booth

(10) Patent No.: US 10,192,268 B2
(45) Date of Patent: Jan. 29, 2019

(54) APPARATUSES, METHODS AND SYSTEMS FOR A DYNAMIC TRANSACTION MANAGEMENT AND CLEARING ENGINE

(75) Inventor: Andrew M Booth, New York, NY (US)

(73) Assignee: NYSE Group, Inc., New York, NY (US)

(*) Notice: Subject to any disclaimer, the term of this patent is extended or adjusted under 35 U.S.C. 154(b) by 483 days.

(21) Appl. No.: 13/189,050

(22) Filed: Jul. 22, 2011

(65) Prior Publication Data

US 2012/0078772 A1 Mar. 29, 2012

Related U.S. Application Data

(60) Provisional application No. 61/367,670, filed on Jul. 26, 2010.

(51) Int. Cl.
*G06Q 40/00* (2012.01)
*G06Q 40/04* (2012.01)

(52) U.S. Cl.
CPC .................................. *G06Q 40/04* (2013.01)

(58) Field of Classification Search
CPC ...................................................... G06Q 40/00
USPC ........................................................... 705/37
See application file for complete search history.

(56) References Cited

U.S. PATENT DOCUMENTS

| 7,376,614 B1* | 5/2008 | Scheinberg | .......... | G06Q 40/025 705/37 |
| 7,870,060 B2* | 1/2011 | Barker | .................. | G06Q 20/10 705/1.1 |
| 8,620,810 B2* | 12/2013 | Karantzis | ............... | G06Q 20/02 705/44 |
| 2002/0156719 A1 | 10/2002 | Finebaum et al. | | |
| 2004/0148249 A1* | 7/2004 | Kinnear | .......................... | 705/37 |

(Continued)

FOREIGN PATENT DOCUMENTS

TW   200933514   8/2009

OTHER PUBLICATIONS

CME Group (Chapter 18 US treasury Bond Futures; Jan. 2009.*

(Continued)

*Primary Examiner* — Muriel S Tinkler
*Assistant Examiner* — John A Anderson
(74) *Attorney, Agent, or Firm* — DLA Piper LLP (US)

(57) ABSTRACT

A Dynamic Transaction Management and Clearing Engine that transforms various data inputs into transaction processing outputs. Contract purchase details, including position volume and purchase volume, for a plurality of contract purchases, each contract having a specified term and trading on an exchange, may be recorded. Short position delivery intents may be received from exchange members having short positions. An instrument nomination specifying a financial instrument to be delivered by a respective associated exchange member may be received for each short position delivery intent. Received short position delivery intents may be aggregated, and a pool of long positions that will take delivery of short positions associated with the aggregated short position delivery intents may be determined. A delivered positions record comprising details for the short positions associated with the aggregated short position delivery intents and the pool of long positions that will take delivery may be generated.

29 Claims, 15 Drawing Sheets

(56) References Cited

U.S. PATENT DOCUMENTS

| | | | | |
|---|---|---|---|---|
| 2006/0224493 | A1* | 10/2006 | Pinkava | 705/37 |
| 2006/0259417 | A1* | 11/2006 | Marynowski | G06Q 40/04 705/37 |
| 2007/0100731 | A1* | 5/2007 | Ward | G06Q 30/08 705/37 |
| 2009/0037345 | A1 | 2/2009 | Barker et al. | |
| 2009/0182658 | A1* | 7/2009 | Lutnick | G06Q 40/00 705/37 |
| 2010/0121755 | A1 | 5/2010 | Spurgin et al. | |
| 2014/0244471 | A1* | 8/2014 | Blauvelt | G06Q 20/10 705/37 |

OTHER PUBLICATIONS

The economic profitability of pre-IPO earnings management and IPO underperformance. Xiong, Yan; Zhou, Haiyan; Varshney, Sanjay. Journal of Economics and Finance 34.3: 229-256. Springer Science & Business Media. (Jul. 2010) (Year: 2010).*

International Preliminary Report on Patentability and Written Opinion of the International Searching Authority, dated Jan. 29, 2013, for PCT International Application No. PCT/US2011/045086, filed Jul. 22, 2011.

International Search Report on Patentability, dated Nov. 15, 2011, for PCT International Application No. PCT/US2011/045086, filed Jul. 22, 2011.

Taiwanese Office Action dated Sep. 14, 2015 from corresponding Taiwanese Patent Application No. 100126449.

* cited by examiner

Fig. 7B

APPARATUSES, METHODS AND SYSTEMS FOR A DYNAMIC TRANSACTION MANAGEMENT AND CLEARING ENGINE

RELATED APPLICATIONS

Applicant hereby claims priority under 35 USC § 119 for U.S. provisional patent application Ser. No. 61/367,670 filed Jul. 26, 2010, entitled "Apparatuses, Methods and Systems For a Dynamic Transaction Management and Clearing Engine,".

The entire contents of the aforementioned application are herein expressly incorporated by reference.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to apparatuses, methods, and systems of transaction management, and more particularly, to APPARATUSES, METHODS AND SYSTEMS FOR A DYNAMIC TRANSACTION MANAGEMENT AND CLEARING ENGINE.

BACKGROUND

Financial instruments are frequently traded in securities markets. Some securities markets allow for electronic trading of financial instruments, such as stocks, bonds, etc. and may be governed by a variety of regulatory requirements.

BRIEF DESCRIPTION OF THE DRAWINGS

The accompanying appendices and/or drawings illustrate various non-limiting, example, innovative aspects in accordance with the present descriptions:

FIGS. 7B-7C provide screenshots of example user interfaces for some embodiments of the DTMC ENGINE;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

DTMC Engine Overview

The DTMC ENGINE facilitates, enhances, and/or provides ("provides") management, analysis and/or communications for entities involved in trading financial instruments and/or related transactions. In one embodiment, the DTMC ENGINE may facilitate the margining, clearing, settlement, delivery, data conversion and/or data reporting of financial securities and/or like instruments ("financial products"), including but not limited to fixed-income derivatives, traditionally-over-the-counter ("tOTC") products, and/or novel financial products. In some embodiments, the DTMC ENGINE provides for the development of futures positions in financial products. Depending on the embodiment, the DTMC ENGINE may be implemented internally by one or more intermediate parties to a financial products transaction, such as an exchange entity or clearing entity. In some embodiments, the DTMC ENGINE may be implemented in a trading platform environment. Alternatively, or additionally, the DTMC ENGINE may be implemented by a third-party service provider as part of a package of services and/or products offered to one or more parties involved in financial products transactions.

Figure 1:
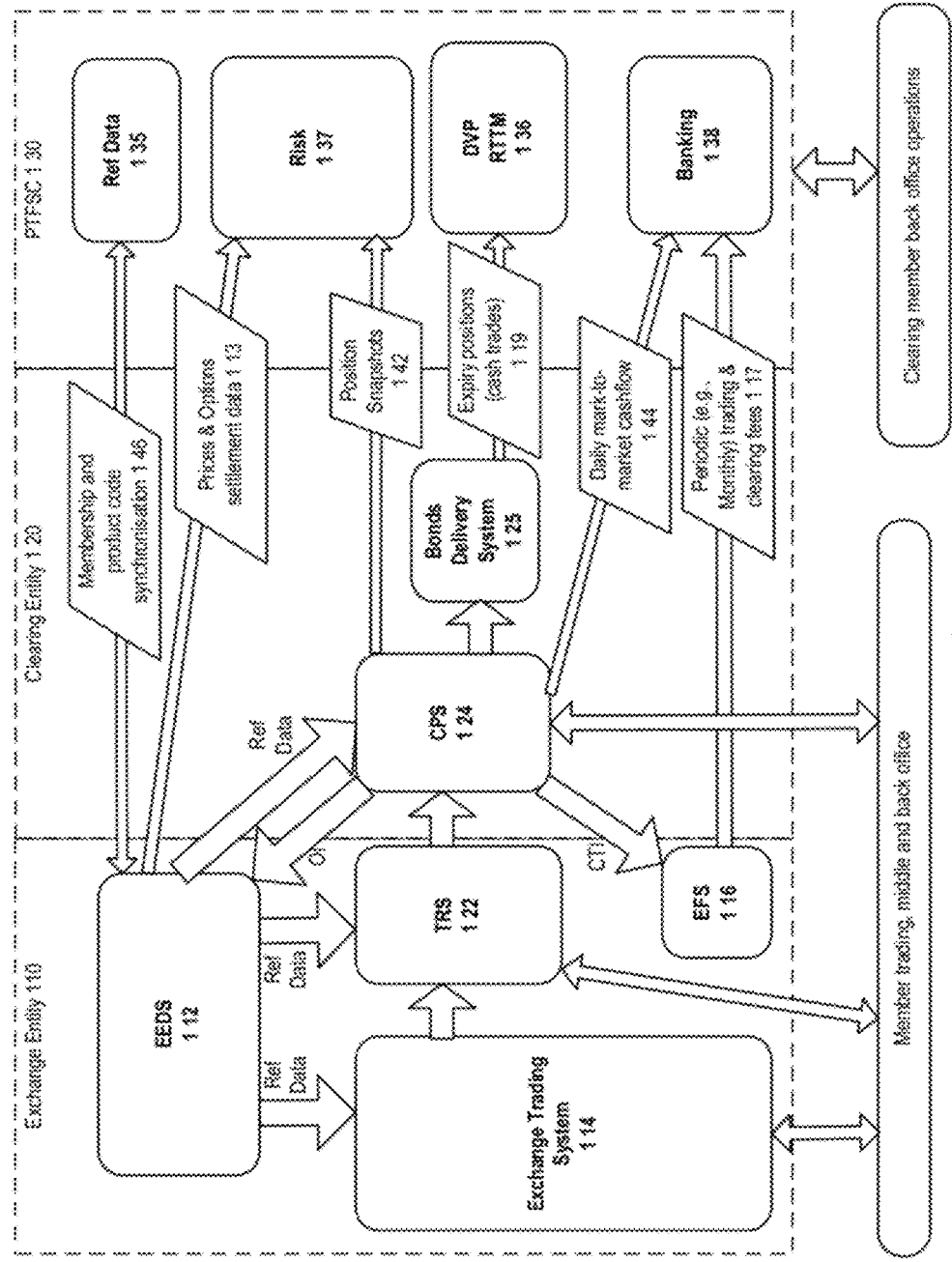
FIG. 1 provides an data flow diagram illustrating various aspects of interactions for embodiments of the DTMC ENGINE.

In some embodiments, the DTMC ENGINE provides trade registration, clearing, and/or position management for financial products. In one such implementation, as illustrated by FIG. 1, the DTMC ENGINE may communicate, interface, and/or otherwise interact with clearing systems, for example, via interaction with Trade Registration System ("TRS") 122 and/or Clearing Processing System ("CPS") 124, of a Clearing Entity 120, such as New York Portfolio Clearing (NYPC) and/or like entity or entities. In one embodiment, the DTMC ENGINE provides risk management, settlement and/or banking services, for example, via interaction with a post-trade financial services company ("PTFSC") 130, such as the Depository Trust & Clearing Corporation (DTCC) or a subsidiary thereof (e.g., Fixed Income Clearing Corporation (FICC)), and/or like entity or entities.

In one embodiment of the DTMC ENGINE, contract transactions or trades for an Exchange Entity 110 (e.g., NYSE Liffe U.S.) cleared through a Clearing Entity 120 may be sent to TRS/CPS 122/124 via a Trade Registration Gateway (TRG). In some embodiments, the DTMC ENGINE allows for products to be cleared via specified Clearing Entities (i.e., Contract A cleared through Clearing Entity X, Contract B cleared through Clearing Entity Y). For example, in one implementation of the DTMC ENGINE, a product may have an exchange code to differentiate products according to a particular Clearing Entity to be used. Such a code may also be used in other elements of the DTMC ENGINE, such as in a Trade Registration System 122. In one embodiment, the DTMC ENGINE may facilitate one or more aspects of locked in trading processes, such as, for example, the interaction between a Clearing Processing System 124 and a Bonds Delivery System 125.

In some embodiments of the DTMC ENGINE, a Clearing Processing System 124 may hold positions for the Exchange Entity products/contracts cleared through a Clearing Entity 120. In such embodiments of the DTMC ENGINE, some implementations may specify information to be provided by the Exchange Entity 110 (and/or related systems) to the PTFSC 130, including, by way of non-limiting example:

End of day files containing details of positions 142 held in each clearing member account (in some embodiments used as an input for risk management systems). For example, such a file may be in XML format substantially in the following form:

```
<XML>
    <Position>
        <MemberName>Member1</MemberName>
        <MemberID>i543</MemberID>
        <Account>H</Account>
        <Instrument>ABC</Instrument>
        <Quantity>500</Quantity>
        <LastPrice>$98.320</LastPrice>
    </Position>
    <Position>
        ...
    </Position>
</XML>
```

Intraday files (e.g., similar in format to end of day files) containing details of positions 142 held in each clearing member account (in some embodiments used as an input for risk management systems);

Daily prices file containing settlement prices and options settlement data 113 (in some embodiments used as an input for risk management systems 137). For example, such a file may be in XML format substantially in the following form:

```
<XML>
    <SettlementData>
        <Instrument>BCD</Instrument>
        <SettlementPrice>$101</SettlementPrice>
        <SettlementDate>20110711</SettlementDate>
    </SettlementData>
    <SettlementData>
        ...
    </SettlementData>
</XML>
```

Calculated daily variation margin data 144 (daily variation margin may be collected from members via the billing process to reflect the daily profit and loss from futures (and/or like) positions). For example, such data may be in XML format substantially in the following form:

```
<XML>
    <VariationData>
        <MemberName>Member2</MemberName>
        <MemberID>i654</MemberID>
        <Account>H</Account>
        <Instrument>CDE</Instrument>
        <Quantity>100</Quantity>
        <PriceChange>$2</PriceChange>
        <ChangeInValue>+$200</ChangeInValue>
    </VariationData>
    <VariationData>
        ...
    </VariationData>
</XML>
```

Billing information (e.g., billing file(s)) containing calculated trading and clearing fees 117 for a banking element/component (e.g., as collected from members via the billing process). For example, such data may be in XML format substantially in the following form:

```
<XML>
    <BillingData>
        <MemberName>Member3</MemberName>
        <MemberID>i765</MemberID>
        <Account>H</Account>
        <TradingFees>$300</TradingFees>
        <ClearingFees>$400</ClearingFees>
        <BillingPeriod>20110711</BillingPeriod>
    </BillingData>
    <BillingData>
        ...
    </BillingData>
</XML>
```

Cash trades for delivered futures (and/or like) positions data 119 (may be settled real time, for example, via a real time trade matching (RTTM) system 136). For example, such data may be in XML format substantially in the following form:

```
<XML>
    <CashTradesData>
        <Buyer>Member4</Buyer>
        <BuyerID>i765</BuyerID>
        <Seller>Member5</Seller>
        <SellerID>i876</SellerID>
        <Instrument>DEF</Instrument>
        <Quantity>300</Quantity>
        <PriceChange>$2</PriceChange>
        <ChangeInValue>+$600 to buyer</ChangeInValue>
    </CashTradesData>
    <CashTradesData>
        ...
    </CashTradesData>
</XML>
```

In some embodiments of the DTMC ENGINE, access to TRS/CPS and/or the Exchange Entity's TRS/CPS may be via a new instance of a system that acts as an application router between the end user terminal/application and the appropriate TRS/CPS environment ("TVS"). In some embodiments, product and/or participant data may be held in both Exchange Entity and the PTFSC systems.

In some embodiments of the DTMC ENGINE, an Exchange Entity's or other entity's product and participant database system ("EEDS") 112 may provide the master product and participant data (e.g., ref data) required by the DTMC ENGINE and/or Exchange Entity systems. However, in some embodiments, the PTFSC may periodically (e.g., daily) provide CUSIP codes (9-character alphanumeric identifier used to identify North American securities for the purposes of facilitating clearing and settlement of trades) and/or like identifiers for products (e.g., Treasury Note/Bond products) that are tradable on the PTFSC cash systems, in some implementations including a textual description for each CUSIP code. In some implementations, these codes may be used as an input to the delivery process, as described in greater detail below.

In one embodiment, a PTFSC Product and Participant system may provide 146 (e.g., via an XML file that includes CUSIPs and/or member IDs along with associated data, such as textual descriptions) the master data 135 for all PTFSC systems. However, in some embodiments, the Exchange Entity may provide PTFSC risk management systems with details of all tradable Exchange Entity products (e.g., futures and options products) cleared through a specified Clearing Entity. In some embodiments, this may include a product identifier assigned by the Exchange Entity's systems for each product (e.g., tradable futures month and tradable options series).

Figure 2:
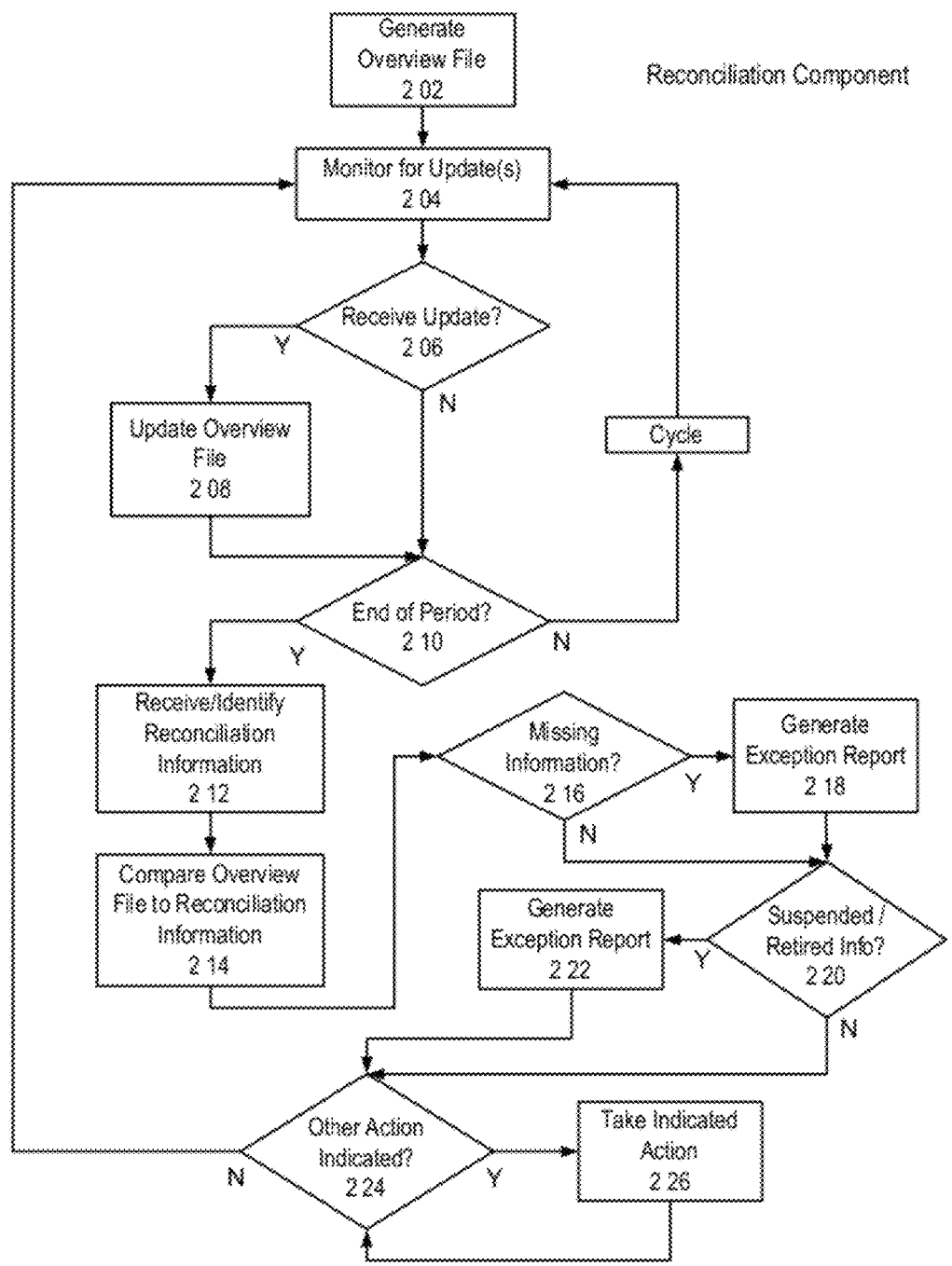
FIG. 2 is of a logic flow diagram illustrating elements of some embodiments of the DTMC ENGINE.

As illustrated by FIG. 2, in some embodiments of the DTMC ENGINE, a file containing details of PTFSC and Clearing Entity members may be generated 202 (e.g., via a PTFSC product master), and this file may be used to conduct a periodic (e.g., daily) reconciliation against the Clearing Entity and PTFSC IDs held in EEDS. In one embodiment, the overview file may be generated 202, and updated 208 according to and/or based on received/entered information 204, 206. At the end of a specified period 210 (e.g., daily), according to reconciliation information 212, the overview file is reconciled 214. For example, if there is missing information 216 (e.g., a Clearing Entity or PTFSC ID exists in EEDS but is not contained in the file) or if information is indicated as restricted or otherwise tagged 220 (e.g., Clearing Entity or PTFSC ID exists in EEDS but are listed as suspended or retired in the file), one or more exception reports may be generated 218, 222 and sent to one or more specified recipients (e.g., Clearing Entity operations), and any resulting or subsequent action indicated 224 may be taken 226.

In some embodiments, the DTMC ENGINE provides and/or facilitates management and oversight of exchange functions, and may additionally facilitate and/or enhance technical administration for clearing membership (e.g., via EEDS) and/or post trade monitoring (e.g., via TRS), including, by way of non-limiting example, one or more of: monitoring of trading, membership set up and maintenance, product maintenance, post trade administration, position management, post trade monitoring, bond delivery, and/or the like.

In some embodiments of the DTMC ENGINE, Clearing Entity members may be identified with specified indicia in Exchange Trading System(s) 114 and/or TRS/CPS 122/124 (e.g., using a three character member mnemonic). In some implementations, trade processing and clearing conducted in TRS/CPS and/or Commodity Management System (system for the allocation of product (e.g., Treasury Note/Bond) deliveries and/or creation of cash trades for booking in a real time trade management system) may reference Clearing Entity members using this ID, as may reports produced by such systems.

Depending on the embodiment, Clearing Entity members may also require a Clearing Entity ID for the purposes of margining, fund settlement and/or reporting in the PTFSC systems. In some implementations, a PTFSC Clearing Entity ID may be required for each margining account held by the Clearing Entity member: one ID for House business and one ID for Customer business. In some embodiments, a House account may be an integrated trading and/or clearing account for proprietary trading, which, in some implementations, may have restrictions regarding registrations/re-registrations and/or may have default netting. Customer accounts may, in some embodiments, refer to accounts for members' customers, and in some implementations may require position administration. In one embodiment, a Clearing Entity member may be classified as one of two classes:

A: Where a Clearing Entity member is also a member of a PTFSC, or is an affiliate of a member of a PTFSC.

B: Where a Clearing Entity member is not a member of a PTFSC.

In the case of a class A member, the PTFSC Clearing Entity ID for House business may be associated with the participant ID used for PTFSC cash business. In some embodiments, the Clearing Entity ID for Customer derivatives business may be standalone. In the case of a class B member the member may have two Clearing Entity IDs.

In some embodiments of the DTMC ENGINE, for the purpose of delivery, any member in class B above may be required to have a defined relationship with a PTFSC member who will be responsible for delivery (e.g., responsible for delivery in the PTFSC delivery versus payment (DVP) system on behalf of the Clearing Entity member). In one such an embodiment, cash trades created as part of the delivery process may be submitted under the participant ID of the PTFSC member, and the Executing Member field may be set to the Clearing Entity ID.

In some embodiments, cross margining may only occur between the cash positions held under the PTFSC participant ID and the positions held in the House account of a Clearing Entity member. In certain embodiments, cross margining benefits may only be provided for Clearing Entity class A members.

Example 1: Class A Member

Joint PTFSC and Clearing Entity member: Brokerage1 USA

| MEMBER | ACCOUNT | CLEARING MEMBER MNEMONIC (TRS/CPS) | PTFSC CLEARING ENTITY ID | PTFSC PARTICIPANT ID (FOR CASH) |
| --- | --- | --- | --- | --- |
| Brokerage1 USA | H | i718 | i234 | i2345 |
| Brokerage1 USA | C | i718 | i256 | i2345 |

In this example Brokerage1 USA is a member of both Clearing Entity and PTFSC. Clearing Entity IDs are be generated for the House (e.g. i234) and Customer (e.g. i256) accounts. In some such embodiments, cross margin benefits may be realized between the House derivatives business held under account i234 and cash business held under account the PTFSC participant account (e.g. i2345). Further, in one implementation, deliveries under Clearing Member i718 may be submitted to the PTFSC DVP RTTM system 136 using Participant ID i2345. The Executing Member may be set to i234 for deliveries from the House account and i256 for deliveries from the Customer account. Derivatives positions sent to the PTFSC risk systems may, in some embodiments, be segregated into House and Customer (Clearing Entity accounts i234 and i256). In some implementations, fund settlement files (e.g., variation margin and fees invoices) may be segregated into House and Customer (Clearing Entity accounts i234 and i256).

Example 2: Class B Member

Clearing Entity member with no PTFSC membership: FCMerchant2

| Member | Account | Clearing member Mnemonic (TRS/CPS) | PTFSC Clearing Entity ID | PTFSC Participant ID (for CASH) |
|---|---|---|---|---|
| FCMerchant2 | H | i940 | i345 | i1234 |
| FCMerchant2 | C | i940 | i356 | i1234 |

In this example FCMerchant2 is a member of Clearing Entity but not a member of PTFSC. As such, FCMerchant2 may require two Clearing Entity IDs for their derivatives business: e.g. i345 for their House derivatives business and e.g. i356 for their Customer derivatives business, and FCMerchant2 may not receive cross margin benefits as they have no related PTFSC membership. FCMerchant2 may require a defined relationship with a PTFSC member to effect delivery of the underlying instrument and/or transaction ("underlyer") on their behalf. If this relationship is with an approved member (e.g. Participant ID i1234) then deliveries under Clearing Member i940 may be submitted to the PTFSC DVP RTTM system 136 using Participant ID i1234. The Executing Member may be set to i345 for deliveries from the House account and i356 for deliveries from the Customer account. Derivatives positions sent to the PTFSC risk systems may be segregated into House and Customer (Clearing Entity accounts i345 and i356), and fund settlement files (variation margin and fees invoices) may be segregated into House and Customer (Clearing Entity accounts i345 and i356).

Clearing Entity

In some embodiments, Exchange Entity products may be cleared via a specified Clearing Entity. In some implementations, fixed income contracts and/or other products may be listed for trading on an Exchange Entity market and may be cleared through a specified Clearing Entity. In some embodiments, trade registration and management for Clearing Entity-cleared products may be provided by a TRS, which may provide the trade registration and management functionality for the Clearing Entity cleared products. In some implementations, trades conducted on the Exchange Entity (e.g., fixed income markets) may be passed to a TRS for registration. Access to TRS may be provided to Exchange Entity Clearing Entity clearing members to view registered trades. TRS functionality may replicate functionality implemented on an Exchange Entity financials market, while some embodiments may have one or more modifications, such as supporting the Exchange Entity account structure and/or end to end processing and validation of trade information, as discussed below.

Figure 3:
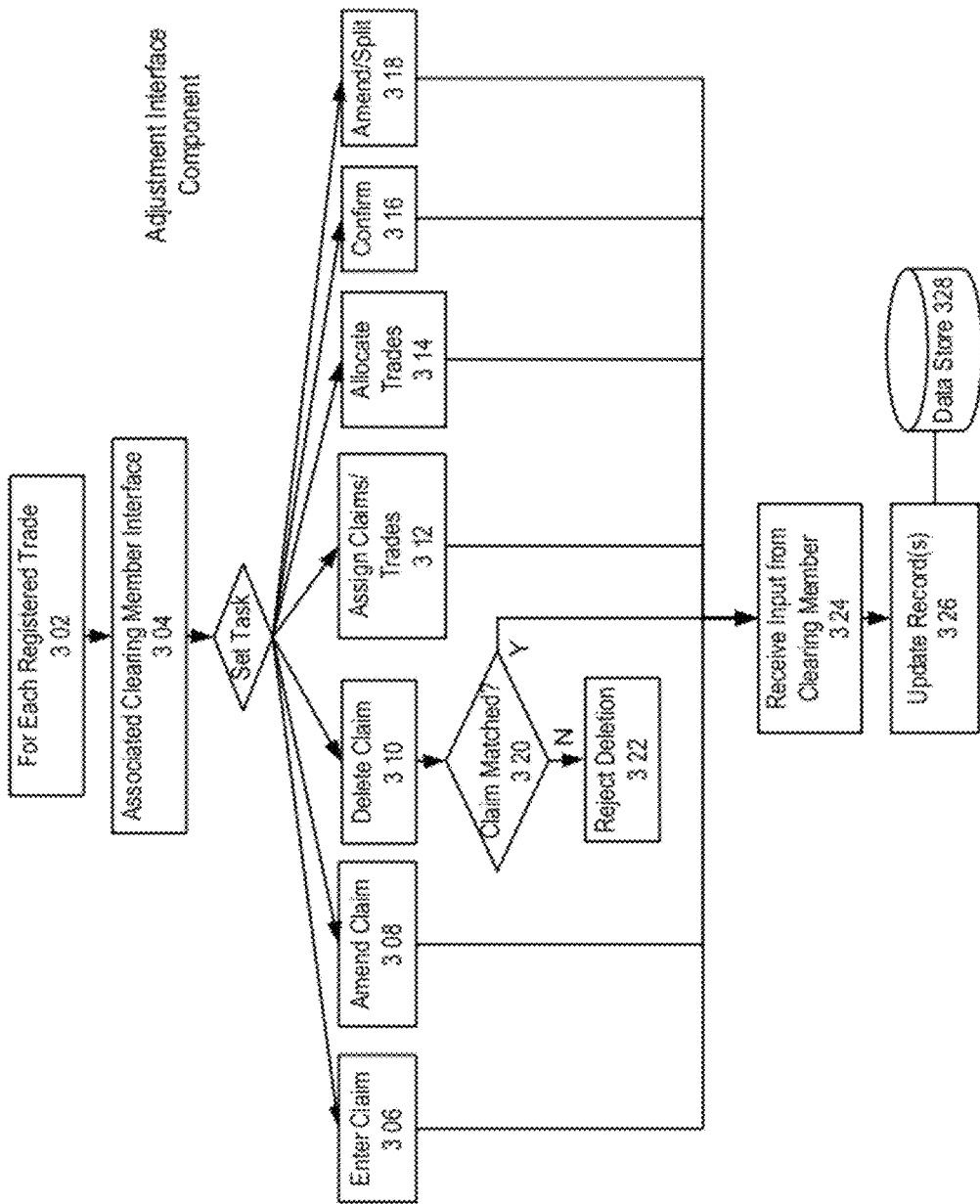
FIG. 3 is of a data flow diagram illustrating aspects of user interface and data acquisition for some embodiments of the DTMC ENGINE.

As illustrated in FIG. 3, in one embodiment, once a trade is registered in TRS 302, clearing members may be able (via a corresponding interface 304) and/or permitted to perform some or all of the following tasks, which in some embodiments may reflect positions held in the CPS intra-day data store 328: enter 306, amend 308, and/or delete 310 claims (in some embodiments, members may not be permitted to delete claims 322 once they have been matched 320); assign trades and/or claims 312 to position-keeping accounts; allocate trades 314 to other members; confirm allocated trades 316; and amend and/or split trades 318. In some implementations, a clearing member is a member of the clearing house that is responsible for the positions held in the clearing system(s) on its own behalf and on behalf of other related exchange members with whom there is a clearing agreement established. The received input/instructions 324 may be utilized to update records 326 (e.g., positions held in the CPS intra-day data store).

In some embodiments, CPS may provide clearing and position management for Clearing Entity products. CPS may be used to maintain positions for the Exchange Entity products (e.g., fixed income products). In some implementations, any trade registered by TRS may be automatically passed to CPS and reflected in the clearing member's position account for that contract.

Access to CPS may be provided to Exchange Entity Clearing Entity clearing members to view and manage positions. In one embodiment, the CPS functionality may replicate that implemented on an Exchange Entity financials market, while other embodiments may have one or more of the following features: changes to support the Exchange Entity account structure; changes to support the delivery process; changes to support new interfaces; variation margin payments; and interfaces to support the Delivery Process.

In some embodiments, positions held in CPS may include both 'registered' business, incorporating positions brought forward from the previous trading day, and 'unregistered' business, incorporating the current day's trades, adjustments, allocations, amendments and splits. Unregistered positions may be registered as part of the end of day processing.

In some embodiments, one or more of the following features for management of positions in CPS may be available to clearing members: Position Transfers (from a position-keeping account to either another position-keeping account or to another clearing member); Exercise Notifications; Auto-Exercise Instructions; and/or the like.

The position management features may be available to members throughout the trading day, and in some implementations, for a specified period (e.g., 30 minutes) after the close of trading. In some embodiments, during the trading day, position-keeping accounts may be shown as gross positions and during the end of day settlement processes, CPS may automatically settle house and market maker accounts—i.e. balanced long and short positions within each account are netted.

In some implementations, segregated and non-segregated customer accounts may be carried forward on a gross basis, although in some instances members may issue manual settlement instructions for their segregated and non-segregated accounts to be settled/netted. In one implementation, Exchange Entity operations may have the ability to set up member segregated and non-segregated accounts to be auto-settled, removing the need for members to submit manual settlement instruction on a daily basis. This configuration may be maintained in an Exchange Entity Database System (e.g., Liffe Database System ("LDS"), the product and participant master database for the NYSE Liffe U.S. trading system) on a per-account basis.

In some embodiments of the DTMC ENGINE, members may be able to adjust any positions that are held gross to reflect true open interest ('close-outs'). In one implementation, positions may be automatically closed out through the use of the open/close indicator on the API. Positions may be netted for margining/risk management functions. In one implementation, a Clearing Entity may maintain net positions for risk management and margining, and members may then declare their gross positions to the Exchange so that open interest can be calculated. In some implementations, automatic settlements may take place before any intra-day CPS processing, such as for option exercises/assignment and deliveries. In one implementation, position transfers and settlement instructions may be permitted in TRS/CPS after the last trading day where the contract allows delivery to take place after the last trading day.

In some embodiments of the DTMC ENGINE, the CPS reports end of day and intraday positions to the PTFSC (e.g., FICC) for risk management purposes. In one implementation, following the end of day processing, CPS may produce a file detailing positions at a clearing member/margining account level. This file may be sent to the PTFSC as input to their risk management systems. In some implementations, an end of day position file may contain positions as they stand after completion of settlement (either gross or net depending on account type and settlement instructions).

In some embodiments, a position snapshot may be provided to the PTFSC on a periodic (e.g., hourly) basis throughout the trading day. In one implementation, the snapshot may contain positions for trades that have been received by TRS at the instance that the snapshot is taken, including those that are not assigned to a CPS position keeping account. In such an implementation, unresolved allocations and unregistered trades held in TRS at the time the snapshot is taken may be represented as positions in the default margining account (i.e., the margining account that is used to hold positions posted to the member's Default position keeping account as part of the end of day processing). In one embodiment, positions in the intraday snapshot may be provided on a gross basis.

In one embodiment, clearing member accounts may be translated to PTFSC Clearing Entity IDs prior to the positions file being sent to the PTFSC. Clearing member margining accounts may be mapped to separate PTFSC Clearing Entity IDs. A margining account may refer to one or more accounts held by a clearing member for the purpose of margin calculations and payments. A position keeping account allows members to identify the origin of positions (e.g., for bookkeeping purposes). Positions held in position keeping accounts may be mapped to a margining account(s).

In some embodiments, CPS may calculate the open interest at an exchange member level for each of the Exchange Entity contracts cleared through a Clearing Entity. In some embodiments, members may not have to submit Open Interest Returns as the Open Interest may be calculated automatically according to and/or based on positions held in CPS. In some embodiments, members may, if necessary, be provided with tools to adjust their gross positions throughout the day within CPS to reflect true open interest. In some embodiments, an Exchange Entity may impose a deadline (e.g., 09:00 T+1 (CT)) for members to adjust their positions post close of trading and Open Interest reports may be published by the exchange following the close of this deadline. In one implementation, the Open Interest calculated by CPS may be included with the end of day files produced by an Exchange Entity Database System.

In some embodiments of the DTMC ENGINE, a specialized TRS or subcomponent thereof, may be utilized to resolve and/or process any unassigned trades or failed allocations. In one implementation, such a feature may, at the end of the trading day, automatically assign unresolved business to a member's default account, such unresolved business including but not limited to unregistered trades (trades that are matched but not yet assigned to a position keeping account or allocated) and/or unmatched trade allocations (trades that have been allocated but are yet to be claimed by the member to whom they have been allocated). In some embodiments, users may not be permitted to use a CPS Position Transfer function for positions relating to any such trade. Any other types of CPS notification (e.g., settlement instructions, exercise notifications) may also be restricted against such business. In one implementation, unresolved trades may be displayed in the specialized TRS on the following day for resolution, and when the trade is resolved, a CPS position transfer notification may be generated automatically to move the trade out of the default account and into the appropriate position-keeping account. In one embodiment, TRS/CPS clearing members may only have one default account that, depending on the implementation, can be set to be either House or Client (but not both) for margining purposes. In such an embodiment, unregistered/unmatched trades may be margined at this level irrespective of the account code held at the trade level.

Some embodiments of the DTMC ENGINE may utilize an interaction gateway (hereinafter "PC Gateway") to support interaction and communication. In one implementation, the PC Gateway may be used to allow members to access and/or download details of trades, settlement prices, reports from TRS, and the like via their computing devices (e.g., desktop/laptop computers, media systems, mobile devices, etc.). Depending on the implementation, the PC Gateway may be provided to or for Exchange Entity members.

PC Gateway functionality, including reports, may be made available for the members on the Exchange Entity platform. The PC Gateway may, in some embodiments, support fractional pricing and/or may provide additional functionality, as described in detail below.

Depending on the implementation of the DTMC ENGINE, the PC Gateway may support a variety of data types and formats, such as, by way of non-limiting example, any and all price formats required. In one implementation, prices in PC Gateway may be displayed using a variety of formats, such as the following:

| | |
|---|---|
| Ticks | In some implementations, this may be the default setting for all file types. Prices may appear as the total number of ticks. For example, for the 10-year Treasury futures contract, the price of $108^{24}/_{64}$ appears as 6936 (i.e., $108^{24}/_{64}$ * 64 = 6936). In some embodiments, this format may be used for prices stored in an internal download file and how they appear in Trade menu functions. |
| Decimal | Prices may appear in decimal format but without the decimal point. For example, a 10-year Treasury futures contract price of $108^{24}/_{64}$ appears as 108375. |
| Fractional | Prices may appear in decimal format with a decimal point included, with no fixed number of decimal places are specified. Instead, prices are justified with zeros placed in the most significant digits. A 10-year Treasury futures contract price of $108^{24}/_{64}$ appears as 108.375. |

Some embodiments of the DTMC ENGINE may support and/or facilitate various account structures and the provision of such structures. In one embodiment, TRS/CPS supports position keeping accounts for each member of the exchange, for example, in one implementation, General Clearing Members ("GCMs", i.e., exchange members that are also members of the clearing house/entity) and Non-Clearing Members ("NCM"). In such an embodiment, within each exchange member, positions may be held in the following accounts:

| CPS ACCOUNT CODE | CPS POSITION-KEEPING ACCOUNT |
|---|---|
| H | House |
| M | Market maker |

| CPS ACCOUNT CODE | CPS POSITION-KEEPING ACCOUNT |
| --- | --- |
| S | Segregated |
| N | Non-segregated |
| D | Default |

In some embodiments, CPS functions, member inputs and reports may be produced at the exchange member/position-keeping account level. In one implementation, an NCM can view their positions within the house (H), non-segregated (N) and segregated (S) levels. A GCM may have access to their own positions at those levels and, in some embodiments, may additionally have complete access to their NCM's positions for enquiry and input of instructions.

In some embodiments, the TRS/CPS account codes may be derived from a combination of the Account Code specified at order entry (discussed below) and the Origin Code, such as illustrated below:

| EXCHANGE TRADING SYSTEM (ORDER ENTRY) | | TRS/CPS POSITION MANAGEMENT |
| --- | --- | --- |
| ACCOUNT CODE | ORIGIN CODE | POSITION KEEPING ACCOUNT |
| <Blank> | 1 (Client) | S (Segregated) |
| <Blank> | 2 (House) | H (House) |
| A (Group Give Up) | 1 | n/a |
| A | 2 | n/a |
| G (Single Give Up) | 1 | n/a |
| G | 2 | n/a |
| M (Market Maker) | 1 | M |
| M | 2 | M |

In such an embodiment, in the case of a Give Up (A or G) the TRS/CPS position keeping account code may be assigned by the carrying firm when the Give Up is claimed in TRS. In some implementations, any unclaimed Give Up may be margined in the default account of the executing member.

The use of non-segregated position keeping accounts (code 'N') may be supported in TRS/CPS for the Exchange Entity market. In some embodiments, members may manually move positions to this account. In some implementations there may be no support for differentiating non-segregated customers business at order entry. This account may, in some embodiments, be used to hold House business that is required to be held gross for open interest reporting (i.e., internal customers and non-exchange member affiliates' business).

In some embodiments of the DTMC ENGINE, margining may take place at the GCM (clearing member) level, and each exchange member account may be margined in either the House or Client clearing member margining account. In one embodiment, the mapping from exchange member position keeping account to clearing member margining account is maintained in an Exchange Entity database system and is configured on a per member basis for each position keeping account. A position file sent to PTFSC may contain positions as held in the margining account in CPS.

In some implementations, although 'A' and 'G' may be used to specify a Give Ups at order entry, it may be required that Give Ups are treated as an allocation ('A') in TRS.

In some embodiments of the DTMC ENGINE, PTFSC systems may calculate initial margin requirements according to and/or based on the input of intraday positions, end of day positions and prices sent to PTFSC (e.g., by the Exchange Entity). In some embodiments, the initial margin may be collateral held by the clearing house to cover the risk of adverse market conditions causing the clearing house a loss in the event of a clearing member default.

In some embodiments, the DTMC ENGINE may be configured to support dynamic, intraday calculation/determination of margin requirements according to and/or based on continuous or near-continuous receipt and factoring of intraday trade positions. In some embodiments the DTMC ENGINE may facilitate dynamic intraday margining requirement calculations and/or enforcement of margin requirements. In some embodiments, the DTMC ENGINE may facilitate single pot margining. In some embodiments, the DTMC ENGINE may be configured to facilitate second-order margin calculations/determination and/or allocations for members' customers according to and/or derived/determined from margin requirements for corresponding exchange members.

In some embodiments, variation margin determinations are performed by CPS. Variation margin may refer to the periodic (e.g., daily) profit or loss calculated for a position held in the clearing systems according to and/or derived/determined from a mark-to-market of that position against the periodic (e.g., daily) settlement price. In one such embodiment, variation margin may be calculated by CPS each day during end-of-day processing.

Figure 4:
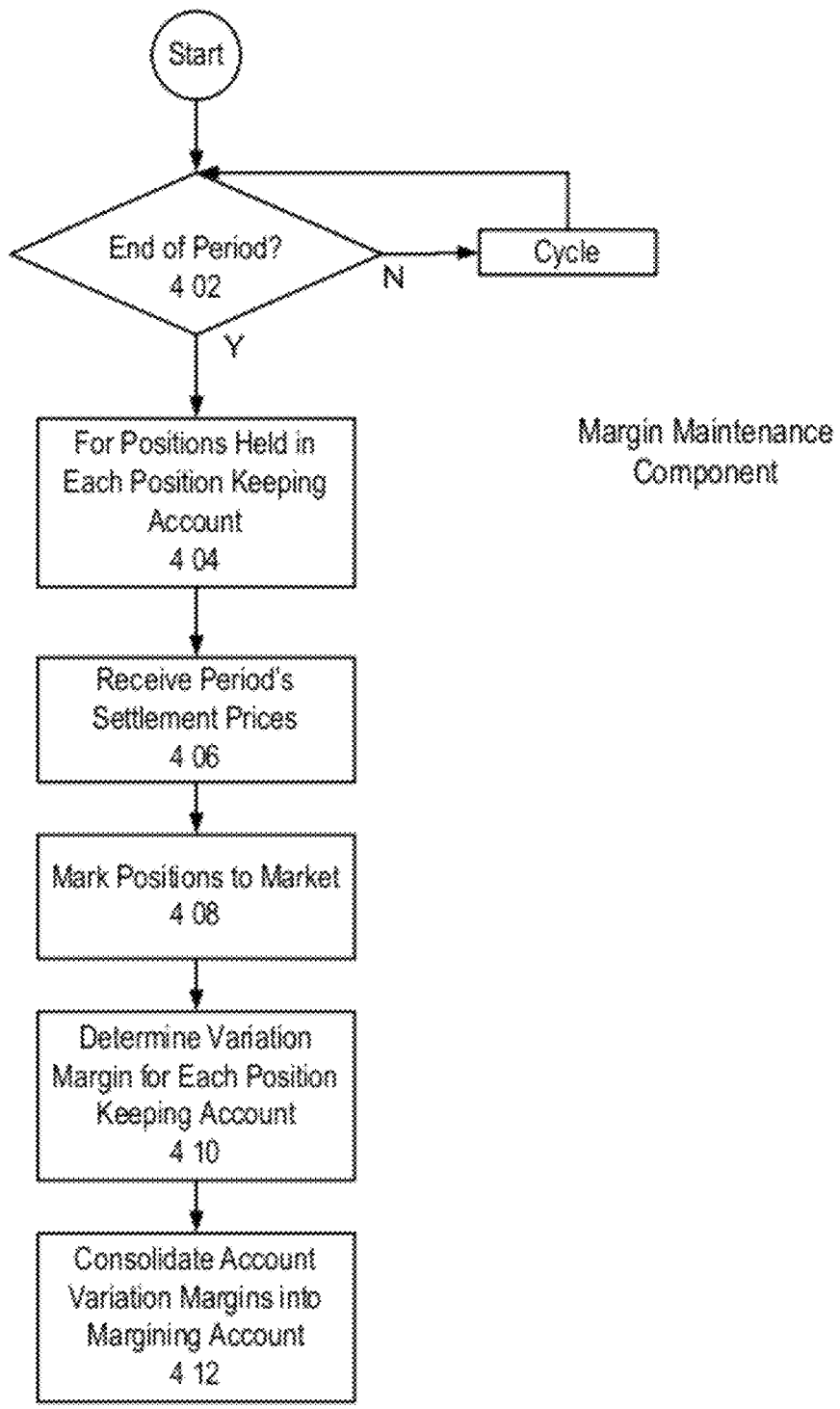
FIG. 4 provides a logic flow diagram illustrating elements of some embodiments of the DTMC ENGINE.

As illustrated by FIG. 4, in one embodiment, at the end of a specified period 402 (e.g., end of day), the positions held in each position keeping account 404 may be marked to market 408 against the period's settlement price 406, e.g., as provided by the Exchange Trading System 114 (i.e., the variation margin calculates a profit or loss according to and/or derived/determined from the delta of the day's settlement price against the previous day's settlement price). Individual variation margins calculated for each position-keeping account 410 may be consolidated into the clearing member margining account 412. The calculated variation margin may be transmitted at margining account level via file transfer (and/or other communication) to the PTFSC systems to be collected from the Clearing Entity clearing members via the PTFSC banking process. In such embodiments, Clearing Entity clearing member IDs may be translated to PTFSC IDs. In some implementations, clearing member margining accounts may be mapped to separate PTFSC participant codes. In some embodiments, variation margins may be displayed in an appropriate report (e.g., a CPS SPAN Margin Summary report (SPN) and/or the like), made available to clearing members.

In some embodiments, an intraday variation margin is calculated to reduce the risk of exposure caused by excessive market movements. In one implementation, the calculation is performed by PTFSC systems. In such an implementation, the intraday variation margin may be calculated by PTFSC risk systems according to and/or derived/determined from intraday snapshots produced by CPS, as discussed below, and market prices may be obtained from a quote vendor. In some embodiments, the market price for the mark-to-market may be calculated by non-Exchange Entity systems.

In some embodiment, the TRS/CPS may generate risk parameter files (e.g., in the London SPAN® format and/or other applicable formats) containing the risk arrays for some or all contracts listed on an Exchange Entity exchange which are cleared through a given Clearing Entity. These risk arrays may be used by the Clearing Entity clearing members to calculate the margin requirements of their customers and internal portfolios.

The input files that facilitate TRS/CPS generation of the risk arrays may be calculated by the PTFSC risk systems and made available via an exchange/PTFSC file interface and/or other communication system. The inputs may be according to and/or derived/determined from the data produced by a VaR (and/or similar) model and may be provided in any number of formats, including but not limited to the standard format. The risk parameter filed may be communicated or made available via a number of methods, e.g., posted to an ftp site accessible via a Clearing Entity website.

In some embodiments, the TRS/CPS may calculate initial margin according to positions held in CPS using the available risk (e.g., SPAN and/or the like) information. In one embodiment, this calculation may not be made available to members but may be provided to PTFSC at a clearing member account level to allow for a direct comparison of risk determinations, assessments, and/or metrics (e.g., comparison of VaR calculations to SPAN, and/or the like).

In one embodiment, TRS/CPS may provide PTFSC systems with fund settlement information. In such an embodiment, TRS/CPS may calculate one or more of the following and pass the values to PTFSC for collection from clearing members: variation margin, premium paid for options, total value of cabinet trades, and/or the like.

In one implementation, the above may be provided at a clearing member/margin account level and sent to PTFSC as separate values, for example, via a fund settlement file and/or the like.

In some embodiments of the DTMC ENGINE, PTFSC systems may be provided with cash trades resulting from futures delivery. In such an embodiment, the initial product set may include treasury futures which deliver into the underlying treasury products. In some implementations, delivered positions in physically delivered fixed income products may be converted to trades in the underlying treasury products for matching in the PTFSC system, and trades may be sent to the PTFSC in a prescribed PTFSC format, if required. In some embodiments, each half trade may be submitted with the Clearing Entity as the counterparty, which may aid PTFSC processing of the trade.

In some implementations, member codes may be in a PTFSC-specific format, and a mapping of Exchange Entity member codes to PTFSC participant codes may be provided by an Exchange Entity database system. In some embodiments, cash trades may not be segregated by House and Client accounts when submitted to the PTFSC systems (as discussed above) and each Clearing Entity member may have a single PTFSC account for delivery.

In some embodiments, cash trades are created according to the delivery procedures of the listed product, as discussed below. In some implementations, PTFSC may require receipt of a cash trades file every day, every business day, and/or the like even if this file does not contain any trades.

In some embodiments, CPS may manage exercise and assignment for options on fixed income futures and/or like products. In such embodiments, CPS may provide the following functionality for Clearing Entity cleared contracts:
Exercise Notifications—enables instructions to be entered to exercise long option positions;
Auto-Exercise Instructions—in addition to entering manual exercise instructions, CPS can be used to exercise certain in-the-money option positions automatically;
Options Assignment—CPS may be used to assign exercised long option positions to short option positions (depending on the embodiment, allocation assignment algorithms may be used for early exercised options).

In some embodiments, expired options on the Exchange Entity market may be automatically exercised if they are in-the-money, for example:
Calls—options strike price may be strictly less than the futures settlement prices;
Puts—options strike price may be strictly greater than the futures settlement prices.

In some embodiments, the deadline for exercise notices may be pre-specified (e.g., set to 16:30 CT), after which time restrictions may prevent members from submitting instructions to manually exercise an option or cancel auto-exercise of an option.

In one embodiment, assignment of expiring options may be via the 'Random Scatter' allocation method, which involves assigning each lot individually, to a randomly selected holder of the opposite options position, totally independently of the assignment of any other lot. In some embodiments, the above may be typical/default functions in CPS.

In some embodiments of the DTMC ENGINE, an Open/Close indicator submitted at an API is supported by TRS/CPS. The Open/Closed field can be used by a trader to indicate whether the order is opening ('O') or closing ('C') a position. In one implementation, the field may default to open when anything other than the close indicator has been submitted. This functionality may have limited availability, in one embodiment only be available for segregated ('S') and non-segregated ('N') position keeping accounts. A trade assigned to the segregated account (e.g., mapped from origin code '1') or non-segregated account with a closing indicator may be automatically netted against open positions held in that account.

The DTMC ENGINE may, in some embodiments, require TRS/CPS to support the end to end processing of information required by one or more regulators. Depending on the implementation, such information may include, by way of non-limiting example: Customer Trade Identifier ("CTI"), user ID, account number, origin code, and/or the like.

In one embodiment, the CTI is stored by TRS and made available to back office systems, via TRS screens, TSCS, PC Gateway, and/or the like, for trades on an Exchange Entity market cleared through the Clearing Entity. The CTI field may be entered by the trading application via the API at order entry. The CTI field may be a single numeric character representing the type of customer on whose behalf the trade is taking place. Depending on the implementation, traders on the Exchange Entity market may have to enter a CTI indicator on the trades, and trades entered directly into TRS may have the CTI indicator populated. TRS may validate the CTI field for trades entered directly into TRS to ensure it is appropriately populated, e.g., with either 1, 2, 3 or 4, representing the following:
1—Applies to transactions initiated and executed by an individual member for his own account, for an account he controls, or for an account in which he has an ownership or financial interest. In some implementations, transactions initiated and executed by a member for the proprietary account of a member firm (as defined below) may be designated as CTI 2 transactions. Example: member broker/trader trading for their own account.

2—Transactions executed for the proprietary accounts of a firm. Example: member broker/trader trading for the clearing member firm's house account.

3—Transactions entered by member or non-member terminal operator for the account of another individual member or an account controlled by such other individual member. Example: broker/trader trading for the account of another member broker/trader present on the 'trading floor' or an account controlled by such member broker/trader.

4—Applies to orders/transactions not included in CTI categories 1, 2, or 3. These may be orders entered by or on behalf of non-member entities. Example: broker/trader trading for any other customer's account or for the account of a broker/trader not present on the 'trading floor'.

In some embodiments, a trade without the CTI code populated with the appropriate values (e.g., one of the above values) may be rejected by TRS/CPS.

In some embodiments, the CTI may be made available to a fees system ("EFS") 116 to be used as a basis for the calculation of trading and clearing fees.

In some embodiments, a user ID may be stored by TRS and made available for back office systems (via TRS screens, TSCS, PC Gateway, and/or the like) for received trades. In one implementation, the User ID is 10 characters and entered by the trading application at order entry using the Trader Card Reference field. In one embodiment, the user ID may be a mandatory field at order entry, trades entered directly into TRS may have the user ID populated. In one embodiment, TRS may validate the user ID field for trades entered directly into TRS to ensure it is properly populated, while in another embodiment, TRS only ensures it is populated, and does not validate the field contents.

In one embodiment, the TRS stores an account number for received trades, which may be made available to back office systems (via TRS screens, TSCS, PC Gateway, and/or the like). In one implementation, the User Specified Field is used by members to submit the account number at order entry, which may be required by applicable regulations (e.g., CFTC regulations). In some implementations, regulations may require the account number be provided on all trades. In such implementations, trades entered directly into TRS may be required to have the account number populated, and TRS may validate the account number field for trades entered directly into TRS to ensure it is populated. In a further implementation, the field contents may be validated.

In some embodiments, the origin code may be stored by TRS and made available for back office systems (via TRS screens, TSCS, PC Gateway, and/or the like) for received trades. In some implementations, the origin code may identify whether business conducted is for segregated or non-segregated accounts. The origin code may be mapped to the account structure, as discussed above. In one implementation, the origin code is provided by the trading application via the Posting Code field in the API at order entry. In such an implementation, the valid values for the Posting Code field are:

| Posting Code Value | Origin Code Value | Meaning |
| --- | --- | --- |
| POSTING_CODE_TYPE_UNDEFINED | 1 | Client/Segregated |
| POSTING_MANUAL | 2 | House/ Non Segregated |

Depending on the implementation, the origin code may be required to be provided on all trades, and if so, trades entered directly into TRS may be required to have the origin code populated. TRS may validate the origin code field for trades entered directly into TRS to ensure it is populated with the appropriate values. There is no requirement to map the Origin Code to the Account Code when a trade is entered directly into TRS, the Account Code may be entered manually by the TRS user.

The DTMC ENGINE may, in some embodiments, facilitate end to end processing of information required by members. In some implementations, TRS/CPS supports the processing of Customer Reference information. The Customer Reference field may be stored by TRS and made available to Back Office Systems for trades on the Exchange Entity market cleared through the Clearing Entity. The Customer Reference field may be used by members for identifying the customer or client for whom the order has been submitted. In some implementations, the Customer Reference field is not validated, while in other implementations the field may be validated, such as when a trade is entered directly into TRS.

In some embodiments, the DTMC ENGINE facilitates member code mapping, thereby enhancing Exchange Entity operations. In one embodiment, files sent to the PTFSC may have clearing member codes in the PTFSC format. In such an embodiment, the systems producing the specific files may translate the Clearing Entity clearing member codes into the relevant PTFSC participant code. The master data for this translation may be held in an Exchange Entity database system and passed to the relevant systems when required.

In one embodiment, Exchange Entity operations/support may be able to maintain the mapping of these codes in the Exchange Entity database system. Exchange Entity operations may work with the Clearing Entity operations to determine the mappings. Depending on the implementation, Clearing Entity operations may have restricted or limited access to the Exchange Entity Database System.

In some embodiments, a separate instance of TCS may be provided for access to the Exchange Entity version of TRS/CPS. As discussed above, a TVS application may be used to route connections from the end users, including those connecting via PC Gateway, through to the appropriate TRS/CPS environment. While some embodiments may utilize a single instance of TVS, other embodiments may utilize one or more new instances of TVS (or like application) for routing connection to the Exchange Entity market.

The DTMC ENGINE may, in some embodiments, allow Exchange Entity exchange Members to perform average price give ups. An average price give up may be used when a member has executed an order on behalf of another member. In some embodiments, in cases where the order has been filled by a number of different matching orders, this may require the executing member to allocate each of these trades separately to the carrying member in TRS. The carrying member may also need to claim each trade separately. In other embodiments, an average price give up allows the executing member to submit a single give up for fills using a price which represents the average of the fills.

In some embodiments, a Consolidation Cross facility in TRS may be used to synthesize an average price give up. This facility allows members to submit a cross trade which on one side nets out against the existing fragmented fills and on the other creates a single fill with a price representing the average of the fragmented fills. In one implementation, the facility may operate in the following way:

The executing Member assigns the original fragmented trades to a proprietary account in CPS (this may generally be the House account as it allows the existing position to be automatically netted against the Consolidation Cross).

On the same day a cross trade is entered directly by the executing Member into TRS, one side closes out the position created by the fragmented fills in the proprietary account, and the other is allocated to the carrying Member as appropriate. The cross is entered into TRS with a trade type of a 'R' ("Consolidation Cross").

If all fills are at the same price, the price of the Consolidation Cross is the same price as each of the fills. If the fills are at different prices, the Member may calculate the average price of all trades and enter the Consolidation Cross at the calculated price. Depending on the implementation, if the average price is not a multiple of the minimum price movement, the responsibility to determine the allocation of the residual amount may fall on the member, and in such an implementation, this allocation may occur outside of the Exchange Entity and/or Clearing Entity systems.

In one embodiment, the TRS may support the calculation of the average price, while in another embodiment the member may calculate this independently. In some embodiments, trades created as a result of the Consolidation Cross facility may not be subject to Exchange Entity trading fees, Exchange Entity clearing fees, and/or Clearing Entity fees. In some implementations, Consolidation Crosses may not be included in any Exchange Entity trading volumes or statistics. An illustrative example of the Consolidation Cross facility is provided below:

1. Client C gives executing Member XYZ an order to buy 500 Jun10 Eurodollar Futures at 98.325.
2. The best offer is at 98.315 so executing Member trades through the depth to get the following fills:
   110 lots @ 98.315
   130 lots @ 98.320
   260 lots @ 98.325
   These trades have an average price of 98.3215.
3. XYZ assigns these trades to the XYZ House ('H') account.
4. XYZ enters a Consolidation Cross of 500 Jun10 Eurodollar Futures at 98.320.
5. The sell side of the Consolidation Cross is assigned to the XYZ 'H' account closing out the position created by the original trades.
6. The buy side of the Consolidation Cross is allocated to Client C's Clearing Member who receives a single price level for the whole size of the order.
7. The XYZ 'H' account has profited by 0.0015 ($3.75 per contract) representing the difference between the price given up (98.320) and the actual average price improvement traded (98.3215). In this example, it is Member XYZ's responsibility to ensure that agreements in place with Client C account for this price improvement.

In one embodiment, the DTMC ENGINE facilitates the support/implementation of electronic Give-up Automated Invoicing System and/or like brokerage fee collection and payment service ("eGAINS") for member firms executing give up transactions. Such support can include collection and transmission of information, including Trade File, Commodity File, Firm File, and/or the like information. Trade File information may be a file generated periodically (e.g., daily) containing records for half trades that have been allocated by one Member to another Member during that period. Transferring of such information may be subject to Member permission, depending on the implementation. Commodity File information may contain details of Clearing Entity-cleared contracts. Firm File information may contain details of members who trade Clearing Entity cleared contracts.

In some embodiments of the DTMC ENGINE, Exchange Entity products cleared through the Clearing Entity may be listed under a separate Exchange Code (e.g., exchange code "V") from those cleared through another mechanism (e.g., OCC). Such an embodiment facilitates member trading applications differentiating trades by clearing mechanism utilized. It may also be utilized to correctly route trades to appropriate clearing mechanism via the TRG. In such embodiments, the Exchange Trading System and supporting systems are configured to list the appropriate products and facilitate indicated products, including supporting the entry of account codes at order entry for Exchange Entity contracts cleared through the Clearing Entity, such as the example shown below:

| ACCOUNT CODE | ACCOUNT |
| --- | --- |
| M | Market maker |
| A | Allocated |
| G | Single Give-Up |

The DTMC ENGINE may facilitate the listing and management of a variety of products, including, by way of non-limiting example, Basket issue Treasury futures—exchange listed futures which permit delivery of a range of Exchange-defined Treasury notes/bonds, Benchmark Treasury futures—exchange listed futures that deliver into the Benchmark Treasury (i.e., the last Treasury note or Treasury note/bond to be issued, also Currently Active Treasury (CAT)), and/or the like. Specific non-limiting examples may include one or more of the following: 2-Year U.S. Treasury Note Futures (CAT), 5-Year U.S. Treasury Note Futures (CAT), 7-Year U.S. Treasury Note Futures (CAT), 10-Year U.S. Treasury Note Futures (CAT), 30-Year U.S. Treasury Bond Futures (CAT), Options on the above Treasury Note/Bond Futures (CAT), 2-Year U.S. Treasury Note Futures (Basket), 5-Year U.S. Treasury Note Futures (Basket), 10-Year U.S. Treasury Note Futures (Basket), 30-Year U.S. Treasury Bond Futures (Basket), Options on Treasury Note Futures (Basket), Eurodollar Futures, Options on Eurodollar Futures, Mid Curve Options on Eurodollar Futures, Swap Futures, Mortgage Backed Security Futures, and/or the like.

Delivery Facilitation

Some embodiments of the DTMC ENGINE provide for and/or support the delivery process for financial instruments, such as, by way of non-limiting example, Treasury Futures, Eurodollar futures, and/or the like. In one embodiment, the DTMC ENGINE facilitates communications and data management relating to delivery of instruments. For example, one implementation may facilitate the PTFSC (e.g., FICC) sending the Exchange Entity a complete list of specified instruments (e.g., Treasury Notes/Bonds) held in the PTFSC systems along with corresponding identifying data and/or indicia (e.g., the related CUSIP code, coupon date, and a text description of the Treasury Note/Bond). Provision of this information may vary depending on the embodiment. In one implementation, this information may be provided periodically (e.g., daily) as a data file (e.g., downloadable XML file, spreadsheet, etc.).

Benchmark Treasury Futures

The DTMC ENGINE can facilitate provision, transaction, clearing, settlement, delivery, and/or management of one or multiple instruments, depending on the embodiment. In one embodiment, the DTMC ENGINE facilitates Treasury futures based on Benchmark Treasuries. Such Benchmark Treasury Futures may have a single delivery day with settlement on the business day after the last trading day of the futures delivery month. In such an embodiment, delivery of the Futures contracts may take place according to and/or derived/determined from the exchange delivery settlement price ("EDSP") calculated on the last trading day.

Figure 5:
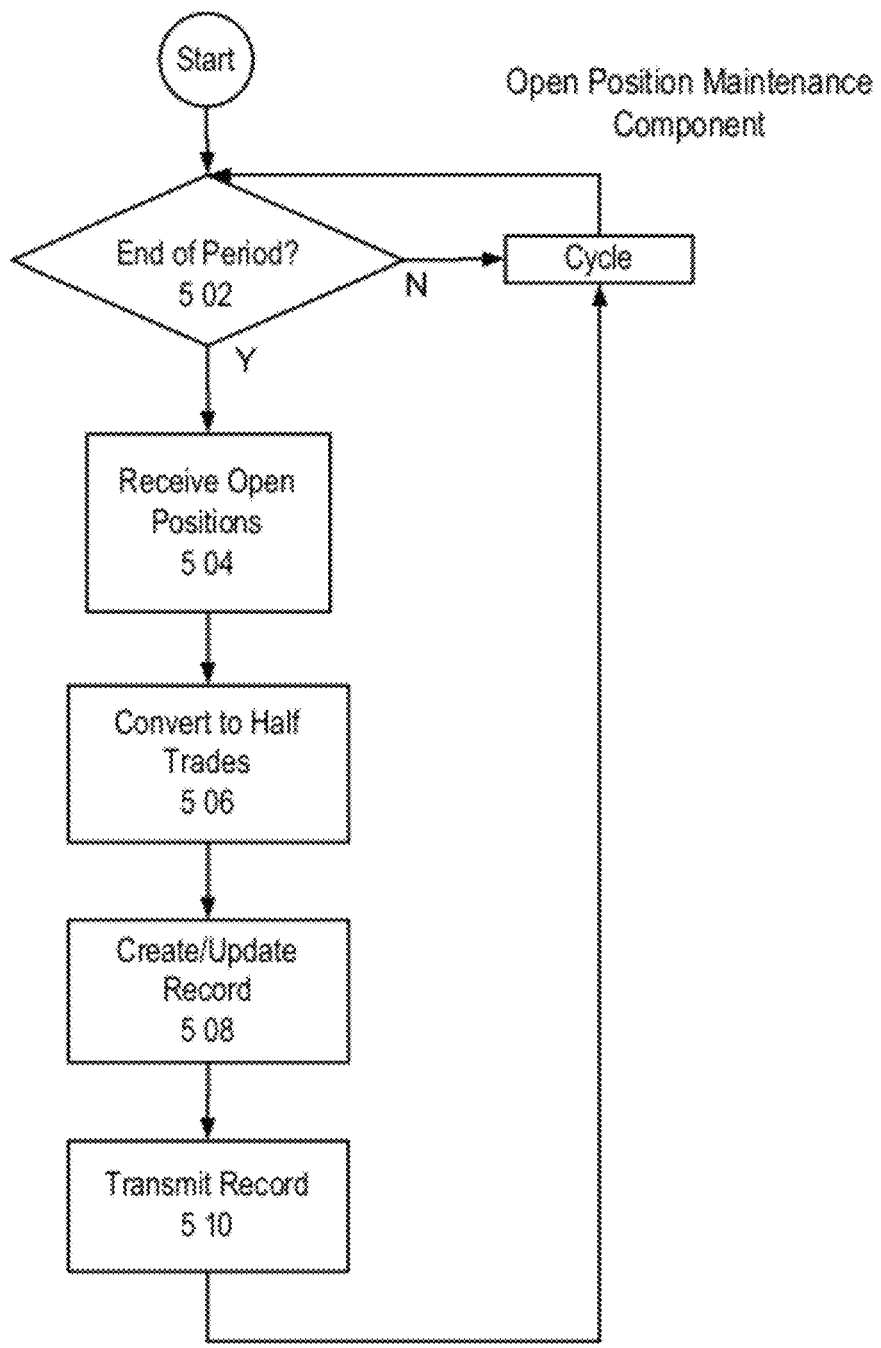
FIG. 5 is of a logic flow diagram illustrating various elements of some embodiments of the DTMC ENGINE.

In such an embodiment, as illustrated in FIG. 5, open positions at close of trading on the last trading day 502 may be received 504 by a Commodity Management System. The Commodity Management System may directly convert the positions to half trades 506 (i.e., half trades in the underlying bond), which may be recorded 508 and/or transmitted 510 for further processing (e.g., sent to PTFSC to be booked on a cash system). In one embodiment, the Clearing Entity may act as a broker on each half trade (i.e., long positions may become Clearing Entity sales of the underlying with the long clearing member as the counterparty, and shorts positions may become Clearing Entity purchases of the underlying with the short clearing member as the counterparty).

Some embodiments of the DTMC ENGINE may be configured to provide oversight, quality assurance, and/or impose restrictions to assure transaction integrity. For example, in one implementation, the Clearing Entity may act as a broker and positions may not be directly matched member to member. As such, trades created on the same trading day in a single treasury note or bond may be specified to have the same Broker Reference Number ID populated on the cash trade record, thus allowing for confirmation that the Clearing Entity half trades balance out to zero for each product.

In some embodiments of the DTMC ENGINE, additional and/or alternative restrictions or limitations may be imposed. In one implementation, restrictions may be imposed according to and/or derived/determined from business and/or risk requirements of one or more participating entities. For example, in one embodiment, PTFSC or another party may request a value cap on trade submissions (e.g., that trades are submitted with a maximum value of $50 million). Depending on the implementation, the DTMC ENGINE may facilitate compliance with such requirements (e.g., a position with a greater value than the specified cap may be broken down into multiple trades).

In one implementation, the deal price of the Treasury Note/Bond may be equal to the EDSP×Contract Size, where:

EDSP=The EDSP price calculated and/or published by the exchange on the Last Trading Day;

Contract=Value of one price point (e.g., $1,000 for Currently Active Size Treasury contracts).

The accrued interest may be calculated and the total invoice value determined. In some implementations, accrued interest refers to the amount of interest that an issuer is obligated to pay, but has not yet paid, to a registered owner of an instrument, for example, for a treasury instrument, the portion of the coupon payment that the seller is entitled to claim from the buyer on the indicated Delivery Date.

In one implementation, the face value (PAR) for each cash trade may be calculated as follows, and communicated to the appropriate entity (e.g., sent to the PTFSC in a single file periodically (e.g., daily)):

Contract Value×No. of Lots where:

Contract Value=Face value of the underlying treasury (e.g., $100,000 for Currently Active Treasury Futures).

No. of Lots=Number of futures lots being delivered in the transaction.

In some such implementations, settlement in the PTFSC systems may be on the business day following the last trading day.

Depending on the implementation, other requirements may include that trades be identified by CUSIP codes and/or other indicia, that an Exchange Trading System be able to list a Treasury futures delivery month prior to the underlying CUSIP code(s) and/or other indicia being known, and/or that individual delivery months within a contract be configured with different CUSIP code(s).

Although instrument specifications may vary, the below provides example specifications for some implementations. In one embodiment, one or more Benchmark Treasury Futures may be supported (e.g., 2, 5, 7, 10 and/or 30 year), with corresponding ticker symbol(s). The trade unit and tick size may be specified (e.g., $100,000 of notional amount of underlying issue, and decimal (0.005 of 1% of notional ($5)). The settlement procedure may also be specified, for example, the product may settle into the underlying security held at a PTFSC, with longs becoming purchases on the underlying and shorts becoming sales at the closing price on the last trading day. Limits/price banding may also apply (e.g., 7-, 10-, 30-year: 60,000 at delivery; 2-, 5-year: 50,000 at delivery), and trading hours may be specified (e.g., 18:16-16:00 (day+1) CT). The auction frequency may follow the Treasury calendar (i.e., quarterly in February, May, August, November) or be otherwise specified.

In one implementation, delivery is configured to permit calendar spread rolling. One contract in respect of each newly auctioned note, expiring at "the date" of the next quarterly auction settlement. 7/10/30 year notes may be auctioned (e.g., quarterly and monthly, and/or the like) such that there may be two contracts open during the new issue auction and its settlement date within which the previous contract would expire. In one implementation, the first trading day may be immediately after the auction of the underlying cash instrument, and the last trading day may be the exchange business day (non-bank holiday BMA) before the settlement of the next new quarterly auction, and the close of trading specified (e.g., 16:00).

Although contract specifications may vary depending on the implementation, the following provides a non-limiting example of contract terms for options on Benchmark Treasury Futures:

| Name: | Options on Benchmark Treasury Futures |
|---|---|
| Trade Unit: | 5-, 7-, 10-, 30-year: $100,000 Notional Amount of Underlying Issue |
| | 2-year: $200,000 Notional Amount of Underlying Issue |
| Underlying Instrument | One Benchmark Treasury futures contract of a specified delivery month. |
| Tick Size (Value): | Decimal 0.005 ($5) |
| Strike Price Interval | 30-year: Strike prices may be listed in intervals of 1 point |
| | 5-, 7-, 10-year: Strike prices may be listed in intervals of half a point |
| | 2-year: Strike prices may be listed in intervals of one-quarter of one point |

-continued

| Name: | Options on Benchmark Treasury Futures |
|---|---|
| Contract Months | One Options expiry for each Futures delivery month. The Options expire one day prior to the last trading day of the future. |
| Last trading day | One day prior to the last trading day of the related future. |
| Exercise | Options are American Style and are exercised by notifying the Clearing House by 16:30 CT on the day of exercise. In-the-money options that have not been exercised shall be automatically exercised following expiration in the absence of contrary instructions. Options exercise into underlying futures. |
| Limits/Price Banding: | None |

Basket Treasury Futures

In some embodiments, the DTMC ENGINE facilitates provision, transaction, clearing, settlement, delivery, and/or management of Basket Treasury Futures and/or like instruments. In some embodiments, an Exchange Entity may specify a basket of Treasury notes/bonds that are eligible for delivery under the terms of such a contract. For example, in one implementation of such an embodiment, delivery of Basket Treasuries may be made by the seller on any business day of the contract delivery month (and the first three days of the following month for 2-year and 5-year treasury futures). Delivery may be initiated by the short position submitting an intention to deliver two business days prior to the delivery day ("intent day"), as discussed in detail below.

Although contract specifications may vary depending on the implementation, the following provides a non-limiting example of contract terms for Basket Treasury Futures:

| Name: | 2 year basket, modified delivery<br>5 year basket, modified delivery<br>10 year basket, modified delivery<br>30 year basket, modified delivery |
|---|---|
| Trade Unit: | 5-, 10-, 30-year: $100,000 Notional Amount of Underlying Issue<br>2-year: $200,000 Notional Amount of Underlying Issue |
| Tick Size: | 2-year: Priced in $32^{nd}$'S allowing for quarters (quarter $32^{nd}$S/15.625)<br>5-year: Priced in $32^{nd}$'S allowing for quarters (quarter $32^{nd}$S/7.8125)<br>10-, 30-year: Priced in $32^{nd}$'S allowing for pluses (half $32^{nd}$'S/15.625) |
| Value of one point | 5-, 10-, 30-year: $1,000<br>2-year: $2000 |
| Settlement Method: | Settles into PTFSC net. |
| EDSP: | N/A (daily settlement price) |
| Limits/Price Banding: | 10-, 30-year: 60,000 in delivery month<br>2-, 5-year: 50,000 in delivery month |
| First Trading Day: | Five contracts open at the same time, H, M, U and Z. A new contract opens on the business day following the last trading day of the current expiring contract. |
| Trading Hours: | 18:16-16:00 CT |
| Last Trading Day: | 10-, 30-year: Trading stops at the end of the seventh business day before the last business day of the month.<br>2-, 5-year: Last business day of the expiring month. |
| Listing/Expiration Months | Quarterly in March, June, September and December. |
| Deliverable securities: | U.S. Treasury notes maturing:<br>10-year: at least 6½ years, but not more than 10 years, from the last day of the deliverable month.<br>30-year: Both maturity date and if callable, the first call date may be 15 years from the first day of the contract expiration month.<br>2-year: at least 1 years and 9 months, but not more than 2 years, from the last day of the expiration month. Original term to be no longer than 5 yr and 3 months from the first day of the contract expiration month.<br>5-year: at least 4 years and 2 months, but not more than 5 years and three months, from the first day of the expiration month.<br>The invoice price equals the futures settlement price times a conversion factor plus accrued interest. The conversion factor is the price of the delivered note ($1 par value) to yield 6%. |
| First delivery day | First business day of the contract expiration month |
| First Position Day | By 20:00 CT, 2 business days prior to first delivery day, firms report positions |
| Intention day | By 20:00 CT, short clearing firm notifies the Clearing Entity intent to make delivery. This can not be reversed. The Clearing Entity provides counterparty member of match. |
| Notice Day | By 12:00 CT, the short reports nominates the treasury to be delivered. The trade is reported to PTFSC by the Clearing Entity based on intention day settlement price. |
| Delivery day | PTFSC matched and confirmed trades fall into PTFSC net. |
| Delivery Period | 10-Year, 30-Year: Any exchange business day during the expiration month of the contract.<br>2-Year, 5-Year: Any exchange business day during the expiration month of the contract plus the first three business days of the following month. |
| Daily closing prices | Last print, if within the last 2 minutes of trading. Otherwise, an alternate specified procedure may be utilized. |

Although contract specifications may vary depending on the implementation, the following provides a non-limiting example of contract terms for options on Basket Treasury Futures:

| Name: | Treasury basket bond options |
|---|---|
| Trade Unit: | 5-, 10-, 30-year: $100,000 Notional Amount of Underlying Issue<br>2-year: $200,000 Notional Amount of Underlying Issue |
| Underlying Instrument | One Treasury futures contract of a specified delivery month. |
| Tick Size (Value): | 30-year and 10-year: 1/64 of a point ($15.625/contract)<br>5-year: One-half of 1/64 of a point ($7.8125/contract)<br>2-year: One-half of 1/64 of a point ($15.625/contract) |
| Strike Price Interval | 30-year: Strike prices may be listed in intervals of 1 point<br>5-, 10-year: Strike prices may be listed in intervals of half a point<br>2-year: Strike prices may be listed in intervals of one-quarter of one point |
| Contract Months | First four quarterlies in the March, June, September, December cycle.<br>Options on March futures expire in February, Options on June futures expire in May, Options on September futures expire in August, and Options on December futures expire in November. |
| Last trading day | The third Friday in the month prior to the futures expiration. Trading in expiring options ceases at the close of the regular trading session for the corresponding futures contract (16:00). |
| Exercise | Options are American Style and are exercised by notifying the Clearing House by 16:30 CT on the day of exercise. In-the-money options that have not been exercised shall be automatically exercised following expiration in the absence of contrary instructions.<br>Options exercise into underlying futures. |
| Limits/Price Banding: | none |

In some implementations, delivery may be via the submission of a trade by a Clearing Entity 120 directly into a PTFSC 130 matching system. Short positions may be allocated to long positions and converted to trades, as described in detail below. In some embodiments of the DTMC ENGINE, matching, allocation, conversion, and/or delivery may be automatic. The price of the trade submitted to the PTFSC system(s) may be according to and/or derived/determined from the settlement price calculated on the intent day and a conversion factor derived/determined from the price of the delivered treasury to yield a specified percentage (e.g., 6 percent).

Figure 6:
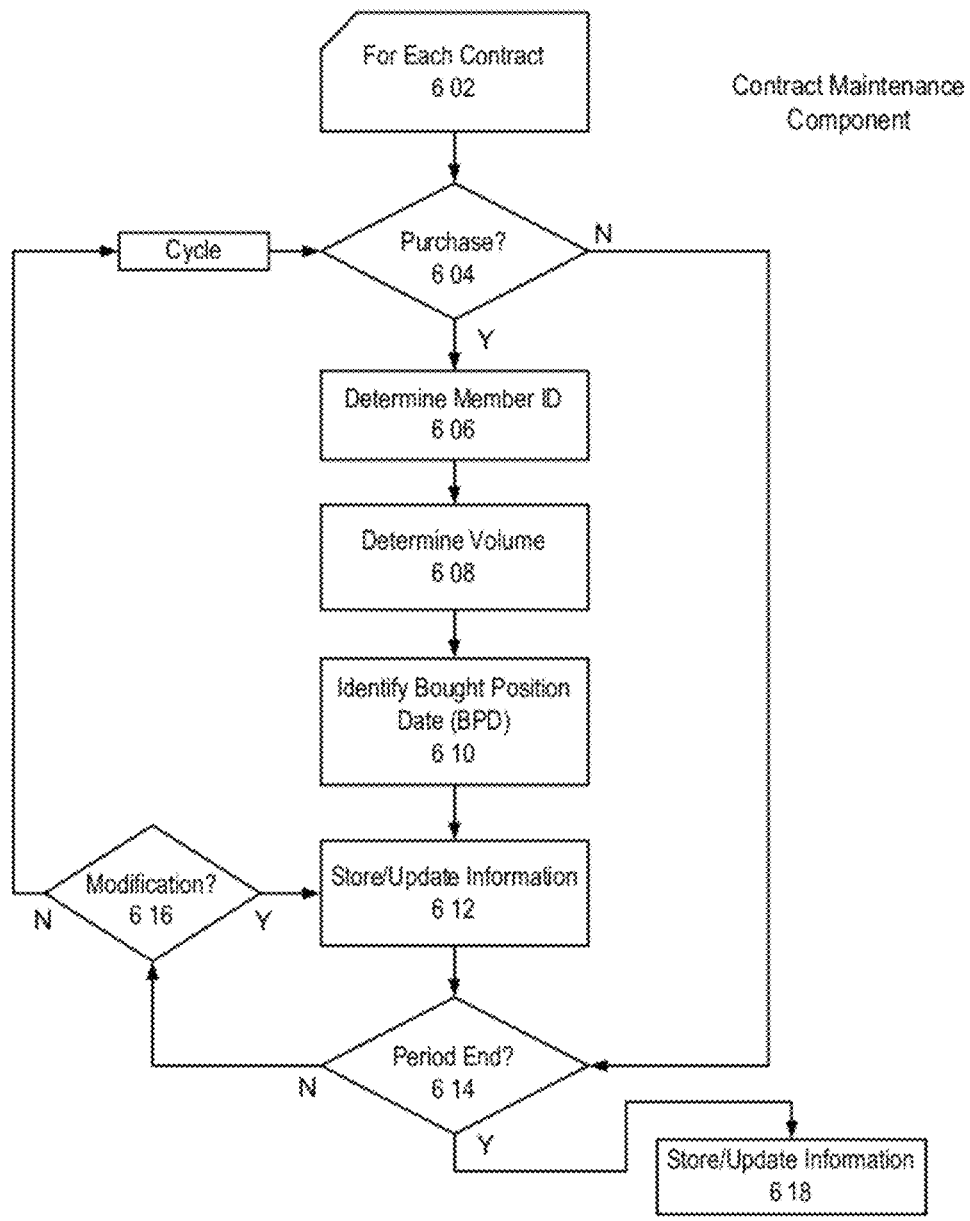
FIG. 6 provides a logic flow diagram illustrating elements of some embodiments of the DTMC ENGINE.

In some embodiments, a clearing system (e.g., a CPS) may automatically record and store details of the volume purchased by each member on each trading date (the Bought Position Date or BPD) throughout the life of a contract. For example, as illustrated in FIG. 6, a clearing system may, for each contract 602, monitor for purchases 604, and when identified, determine the member making the purchase 606, determine the volume of the purchase 608, identify the BPD 610, and store and/or update one or more records 612, 618, according to and/or derived/determined from the collected information and/or received record modifications 616, for the life of the contract 614. In some embodiments, if a member's long position reduces to zero overnight, their Bought Position history may be automatically erased.

Various delivery processes may be implemented, depending on the embodiment of the DTMC ENGINE. The three-day delivery process discussed below is a non-limiting example, illustrating for one implementation of the DTMC ENGINE.

In such an embodiment, on day 1 (T) a member having a short position and wanting to initiate delivery for T+2 submits an intent to deliver (e.g., into the clearing system) by some specified time deadline (e.g., 20:00 CT) on day 1 (T) of the delivery cycle. Depending on the implementation, the deadline for submitting an intent may be configurable by an administrator or other specified party. In one implementation, clearing members may be able to enter the intent at any point during the trading day up until the intent deadline.

Figure 7A:
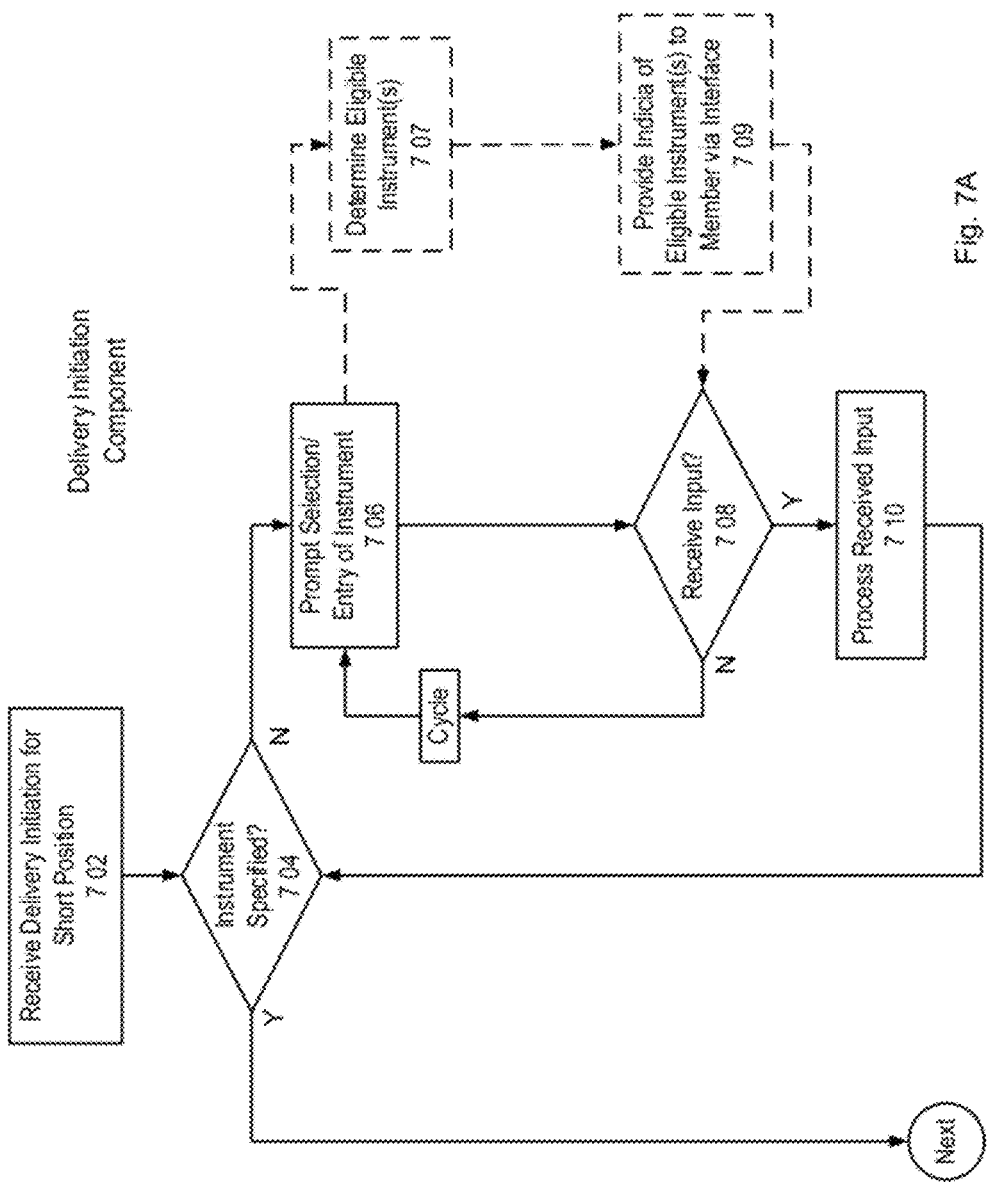
FIG. 7A is of a logic flow diagram illustrating various elements of some embodiments of the DTMC ENGINE.

In some embodiments, members having a short position may be provided with the ability to nominate the Treasury Note, Treasury Bond, and/or the like that they are delivering at the time that the intent to deliver is submitted. As illustrated in FIG. 7A, a clearing system may receive a delivery initiation for a short position 702 and determine if the instrument is specified 704. If the instrument is not specified, the member may be prompted to enter or select the instrument 706. Subsequent member input is received 708 and processed 710 to confirm that instrument is specified 704. In one embodiment, a user interface may be provided (e.g., a drop-down menu), allowing the short member to select the relevant treasury for each delivery note. In one implementation, eligible instruments are determined 707 (e.g., according to the terms of the contract and/or other specifications), and indicia of the eligible instruments are provided on the interface 709. In such an implementation, the menu/interface may be restricted to the Treasuries that have been determined (e.g., by the Exchange Entity) to be deliverable Notes/Bonds under the terms of the contract. Depending on the implementation, one or more of the following details may be provided to the short member via the interface for each deliverable treasury: CUSIP, Coupon Rate, Maturity Date, etc. In some embodiments, this may be an optional process for the short member. In some embodiments, the deadline for nominating the deliverable note/bond will be on the Notice day (as discussed below).

In some embodiments, Members desiring to deliver different Treasury Notes/Bonds (and/or the like) on a single delivery day may be prompted to enter/submit separate Intents for each deliverable. In other embodiments of the DTMC ENGINE, for a Member desiring to deliver different Treasury Notes/Bonds on a single delivery day, the DTMC ENGINE may be configured to provide, enable, receive, and/or process a splint Intent and/or the splitting of an Intent to allow for multiple Note/Bond deliveries.

Figure 7B:
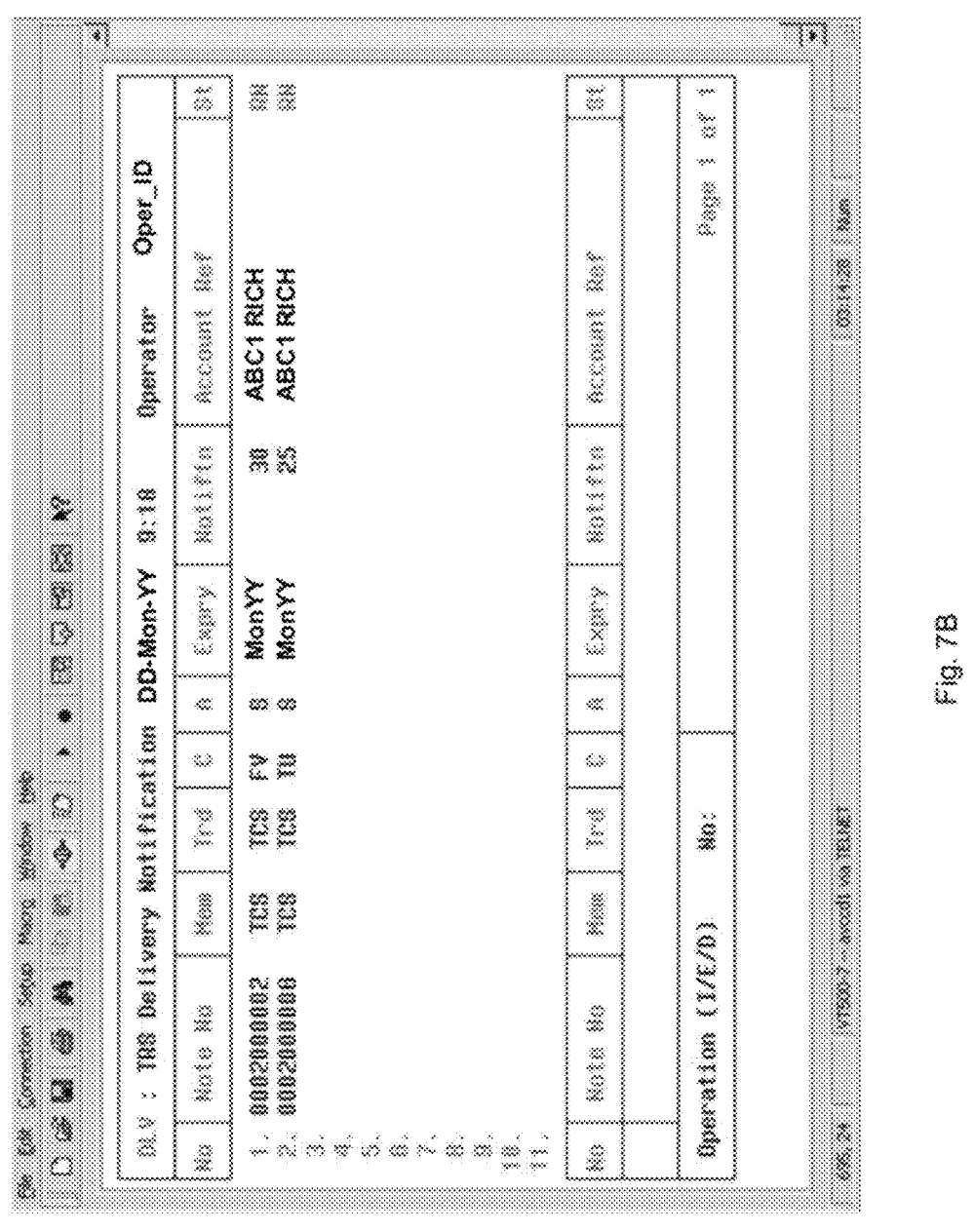
Figure 7C:
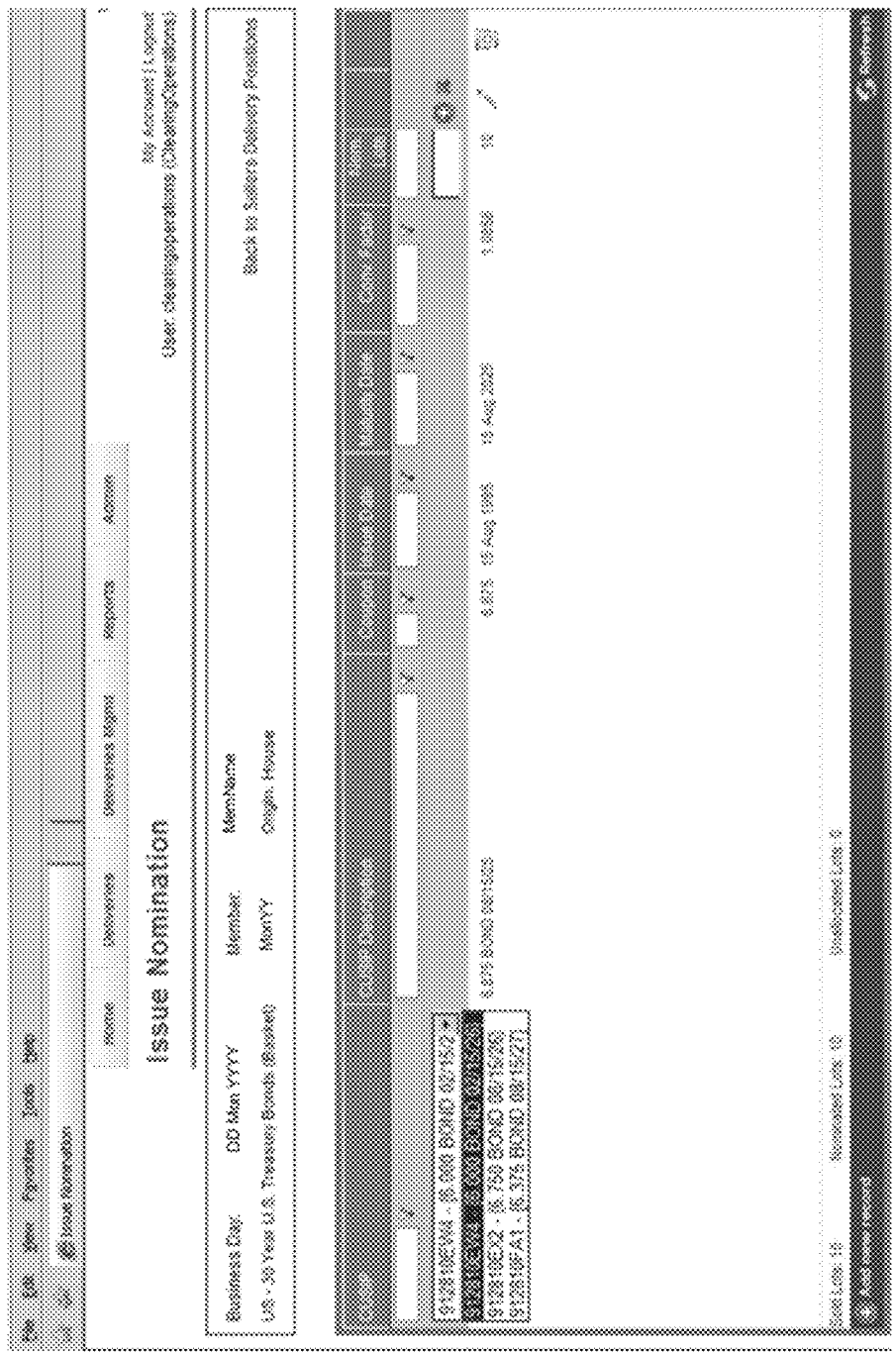

FIG. 7B provides a screenshot of an example intent screen user interface for one embodiment of the DTMC ENGINE. FIG. 7C provides an example bond nomination screen user interface for one embodiment of the DTMC ENGINE.

Figure 8:
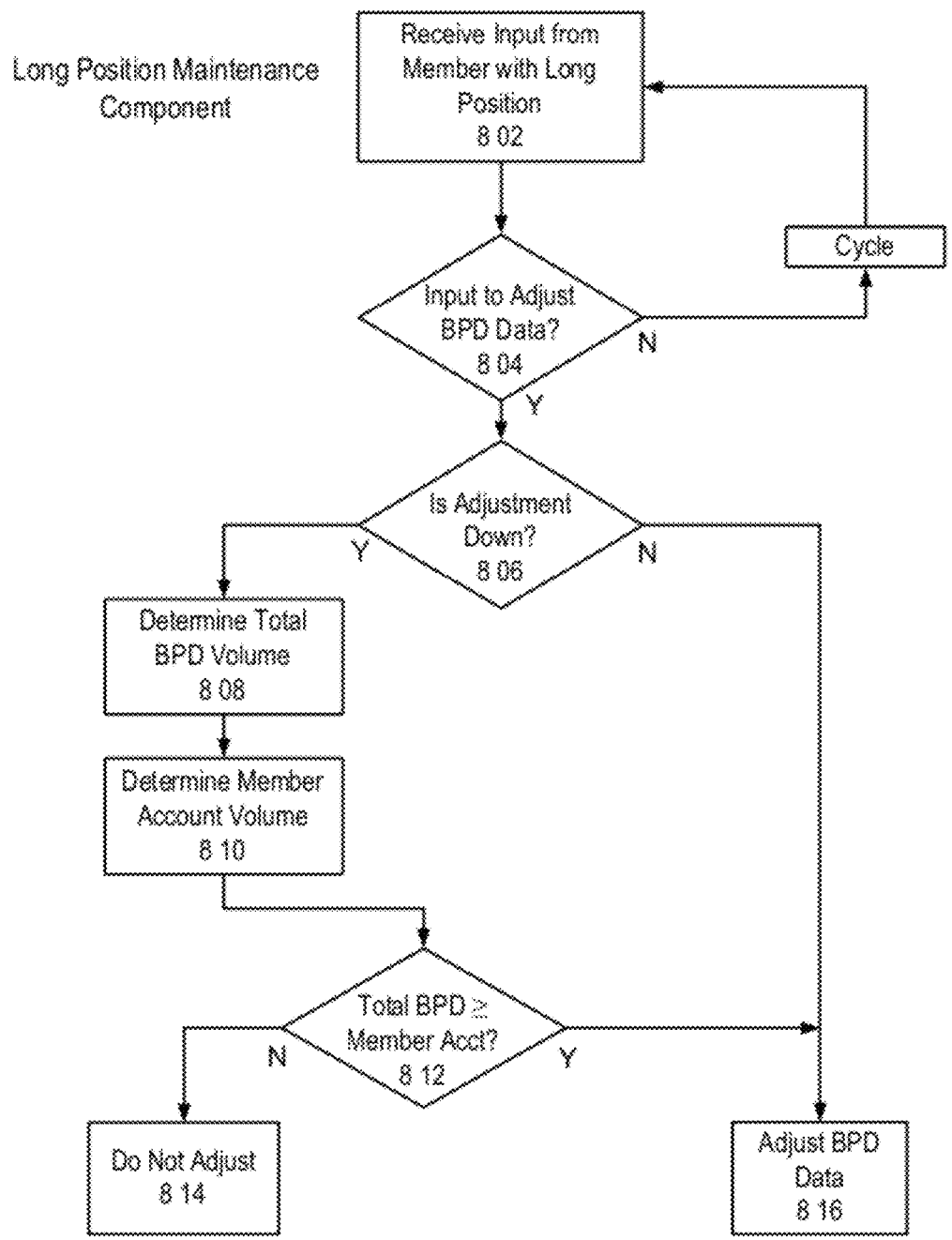
FIG. 8 is of a logic flow diagram illustrating elements of some embodiments of the DTMC ENGINE.

In some embodiments, exchange members with long positions may be permitted to adjust their Bought Position Date (BPD) data. As illustrated in FIG. 8, in one such embodiment, input/communications from a member with a long position may be received 802, and if the input relates to adjust BPD data 804, a determination is made as to whether the adjustment is a downward adjustment 806. If the adjustment is not down 806, the BPD data is adjusted 816. If the adjustment is down 806, the total BPD volume is determined 808 and the member account volume is determined 810. If the total BPD volume is greater than or equal to the member account volume 812, the BPD data is not adjusted 814, while if the total BPD volume is less than the member account volume 812, the BPD data is adjusted 816. In such an embodiment, the volume against each date can be reduced down provided the total BPD volume is greater than or equal to the member account volume. Some implementations may limit access to this facility (e.g., available until 20:00 CT each day).

The example code below further illustrates the above aspects for one embodiment of the DTMC ENGINE:

```
//if the keyed input is to Adjust BPD data and the direction indicated
//for the adjustment is down, check the volume of the BPD against the
//accounts volume. If the BPD Volume is greater, adjust the BPD
//according to the data keyed in by the account holder
if (keyed_input.type == "Adjust BPD Data" &&
keyed_input.direction == "Down")
{
    if (Member.BPD.Volume( ) > Members.Accounts.Volume( ))
        AdjustBPD(keyed_input.data);
}
```

In some embodiments, positions data for deliveries may be according to and/or derived/determined from close of TRS/CPS on intent day (T). In some implementations, although the trading day for T+1 may start prior to the deadline for intents and long position maintenance, any changes to positions based on trading on trade day T+1 may not be reflected in the positions used for delivery.

Figure 9:
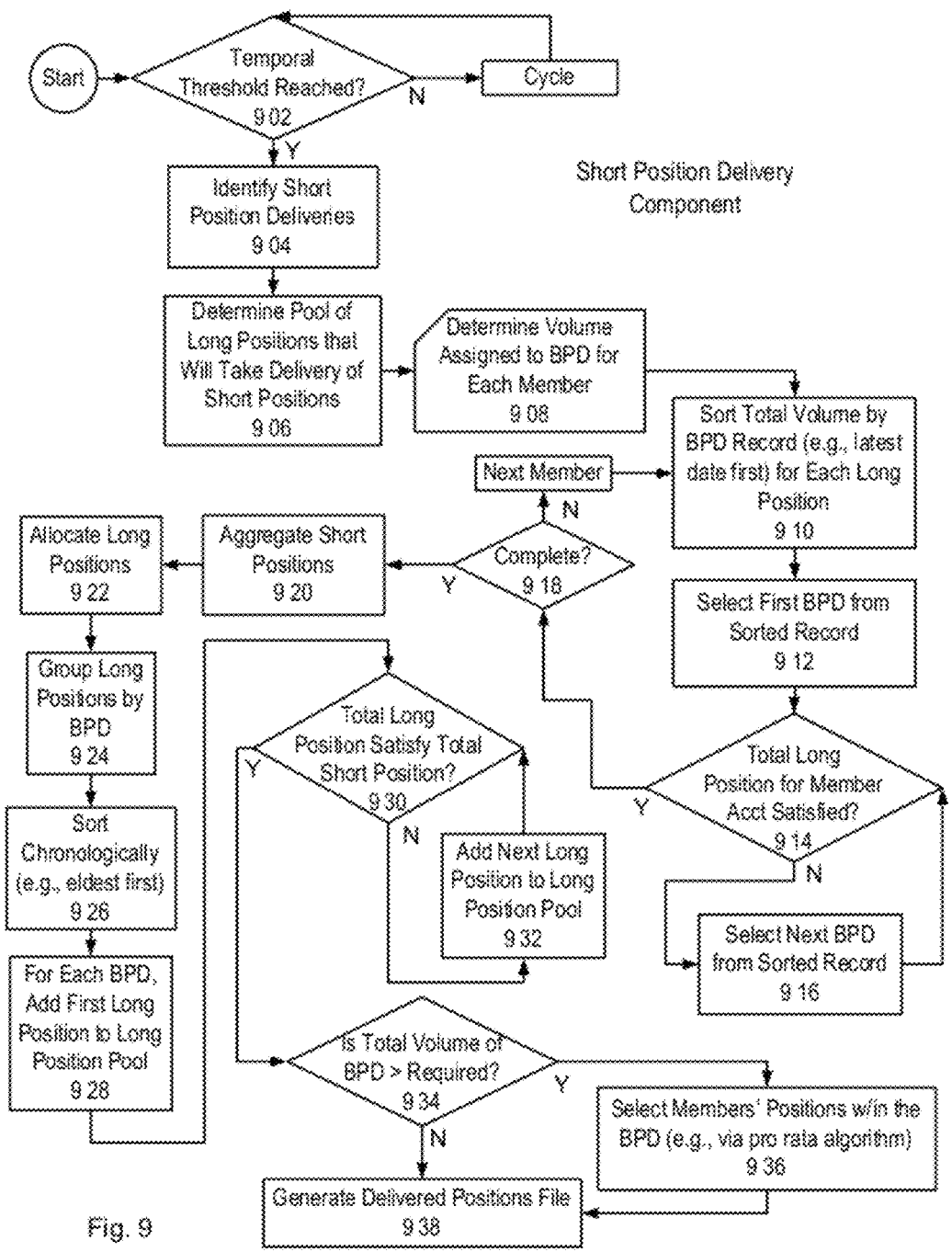
FIG. 9 provides an illustrative logic flow diagram addressing elements of some embodiments of the DTMC ENGINE.

In some embodiments, as illustrated in FIG. 9, after a specified temporal threshold has been reached 902 (e.g., after 20:00 CT), the clearing systems may calculate/determine a pool of long positions 906 that may take delivery of indicated short positions 904, for example, according to an Oldest Long/"Vintage" assignment and/or the like.

In one such implementation, the volume assigned to a Bought Position Date for each exchange member 908 may be determined/calculated by sorting the total volume for each long position by BPD record 910 (with the latest date first), then selecting the Bought Positions Dates in turn 912, 916 until the total long position for that member account has been satisfied 914.

Upon completion 918, the short positions that have submitted intents to deliver 904 may be aggregated 92o and allocated 922 to the long positions, for example, via a "position date pro-rata" basis and/or the like. In such an embodiment, long positions may be grouped by BPD 924, and sorted chronologically 926 (e.g., eldest date first). The long positions within each BPD may then be added to the long position pool in turn 928, 932 until the total long position is sufficient to satisfy the total short positions 930.

In some additional or further embodiments, if the total volume of a BPD is greater than required 934 (i.e., the remaining short position is not sufficient to satisfy the whole volume within a BPD), the members' positions within the BPD may be otherwise selected 936 (e.g., via a pro-rata algorithm).

In some embodiments, a "delivered positions" file or record may be generated/produced 938, detailing short positions that have submitted intents and the pool of long positions that are to be assigned delivery. In some implementations, this file may contain positions at a clearing member level segregated by margin account, and may also include details of any nominated deliverable Note/Bond. In some embodiments, the file and/or equivalent information may be sent or otherwise provided to the commodity management system and/or other indicated entity. In some embodiment, a delivered positions file/record and/or delivered positions information may be utilized to effectuate delivery, reconcile accounts, and/or update transaction record(s).

In some embodiments, the delivered positions may also be reflected in the end of day positions in TRS/CPS (i.e. delivered positions will be removed from TRS/CPS). In some implementations, long positions may be notified of the quantities they are to receive (e.g., via a HIT report or the like). In some such embodiments, this report may be produced at an exchange member level, while in other embodiments, the report may be more granular.

In some implementations of three-day delivery process embodiments, each short clearing member may nominate the treasury security issues that they are to deliver for their delivery commitment. In one implementation, House and Client accounts may be treated separately. In some implementations, clearing members submit separate nominations for each account. In some embodiments, such functionality may be provided by the commodity management system. Depending on the implementation, the nominations may have to be received at a specified deadline (e.g., 10:00 CT) on day 2 (T+1, or Notice Day).

In some embodiments, prior to the first intent day, Clearing Entity operations may specify a list of deliverable bonds for each treasury futures contract in the commodity management system. Exchange Entity systems may be configured to provide the ability for operations to pick/specify the list of deliverable bonds from a comprehensive list of bonds (e.g., as provided by the PTFSC). In some embodiments, bonds not contained in the PTFSC file may not be tenderable on the Exchange Entity contract. The deliverable bond list may be transmitted or otherwise made available to the commodity management system.

In one embodiment, on Notice Day, each clearing member with a short position will nominate a bond from the deliverable bonds list. The short position may be restricted to selecting a bond from the list of deliverable bonds. In some embodiments, an interface, such as a drop down list, that shows the deliverable note/bond(s) may be provided to the short clearing member. The interface may provide any or all of the following details for each deliverable note/bond: CUSIP, coupon rate, maturity date, and/or the like.

As discussed above, some implementations of the DTMC ENGINE may be configured to enable Members who wish to nominate multiple Notes/Bonds for a single Intent to deliver to split the Intent. In some implementations, it may not be possible to deliver more than one Note/Bond for a single lot.

Figure 10:
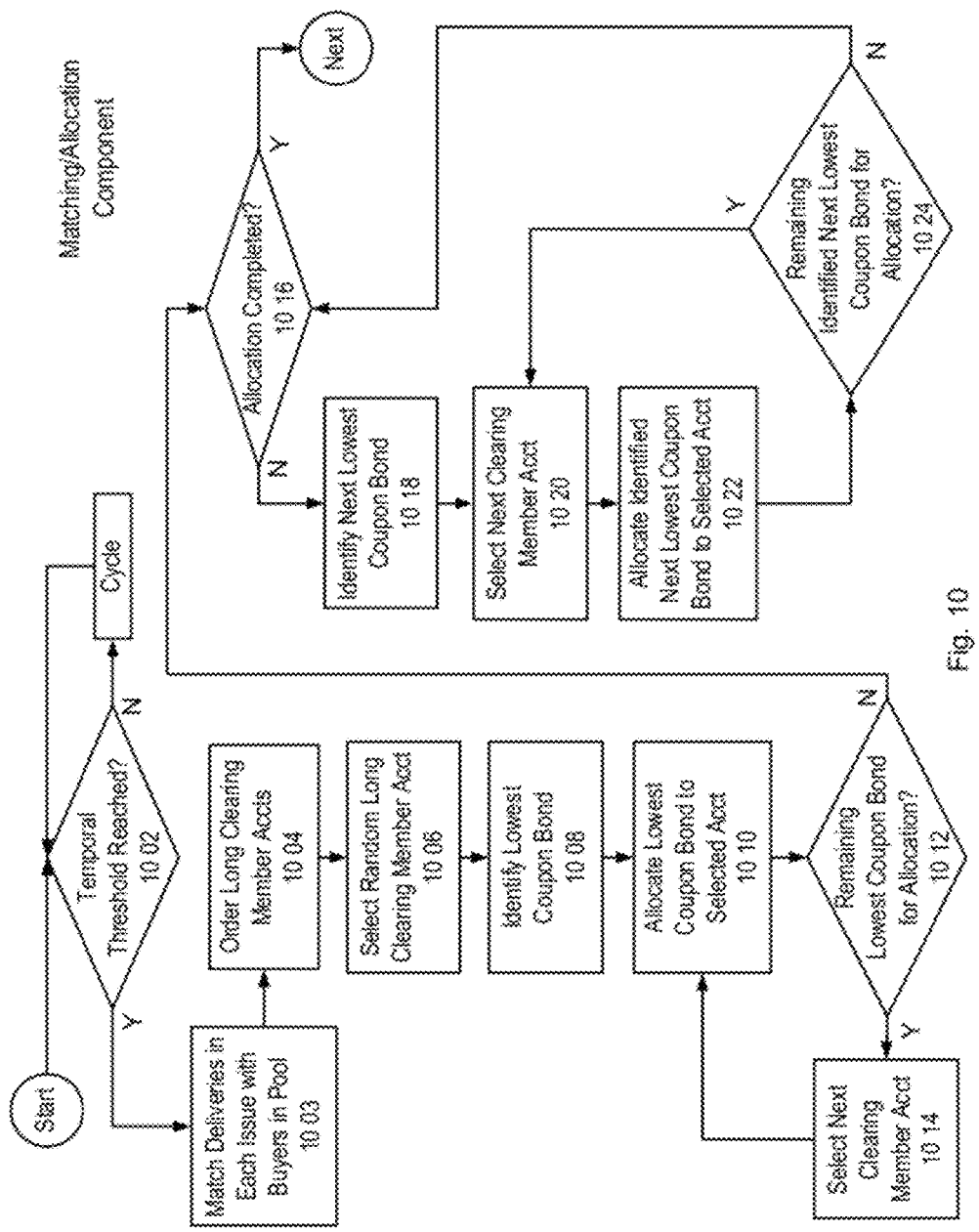
FIG. 10 is of a logic flow diagram illustrating elements of some embodiments of the DTMC ENGINE.

As illustrated by FIG. 10, in some embodiments of the DTMC ENGINE, after a specified bond nomination deadline 1002 (and in some embodiment, prior to a specified subsequent time, e.g., 12:00 CT) or achievement of a like temporal threshold, the commodity management system may match deliveries in each issue with buyers in the long position pool 1003 (e.g., via a random strip algorithm and/or the like). In one such embodiment, long clearing member accounts may be ordered 1004, for example, listed in member mnemonic sequence, numeric first followed by alphabetic, and a starting account chosen at random 1006. Allocation of the lowest coupon bond 1008 commences 1010 with the selected mnemonic and progresses 1012 through the list of members' accounts 1014. When no further allocation of the lowest coupon bond can be made 1012, and the allocation is not completed 1016, the allocation continues 1020, 1022, 1024 with the next lowest coupon bond 1018. In some embodiments, bonds of equal coupon but different maturities may be nominated. Some implementations of such embodiments of the DTMC ENGINE may be configured such that those bonds with the earliest maturity may be selected first.

The example code below further illustrates the above aspects for one embodiment of the DTMC ENGINE:

```
if (time >= TEMPORAL_DEADLINE) //if the time is >= the deadline
{
    //go through accounts
    //if an account is long_clearing
    //add it to the list of long clearing accounts
    for (i=0; i < NUM_ACCOUNTS; i++)
    {
        if (Accounts[i].long_clearing == TRUE)
        {
            LongClearingAccounts.AddAccount(Accounts[i]);
        }
    }
    //order the accounts by mnemonic
    Sort(LongClearingAccounts);
    //go through bonds
    //if a bond is nominated, add it to the list of nominated bonds
    for (i=0; i < NUM_BONDS; i++)
    {
        if (Bonds[i].is_nominated == TRUE)
        {
            NominatedBonds.AddBond(Bonds[i]);
        }
    }
    //sort the bonds first by coupon
    //sort again for maturity, preserving the previous coupon sort
    SortBondsByCoupon(NominatedBonds);
    SortBondsByMaturityPreserveCoupon(NominatedBonds);
    //pick a random account in the list
    selectedAccount = RandomNumber( );
    //while there are still bonds in the nominated list
    //put that bond into an account, starting with the first
    //selected account and progressing through the accounts
    //if the selectedAccount number reaches the size of the Accounts
    //i.e., if it reaches the end of the Accounts, start over at 0,
    //i.e., the beginning. Continue until the bonds are allocated
    while (NominatedBonds.Size( ) > 0)
    {
        Accounts[selectedAccount].bonds.AddBond(NominatedBonds.First( ));
        NominatedBonds.Delete( );
        NominatedBonds.Next( );
        selectedAccount++;
        if (selectedAccount == Accounts.Size( ))
            selectedAccount = 0;
    }
}
```

In some embodiments of the DTMC ENGINE, once the allocation is completed 1016, the commodity management system may then create cash trades, which may be sent to PTFSC. In some embodiments, the Clearing Entity may act as a broker to each trade, as described below with respect to FIG. 11 and FIG. 12.

Figure 11:
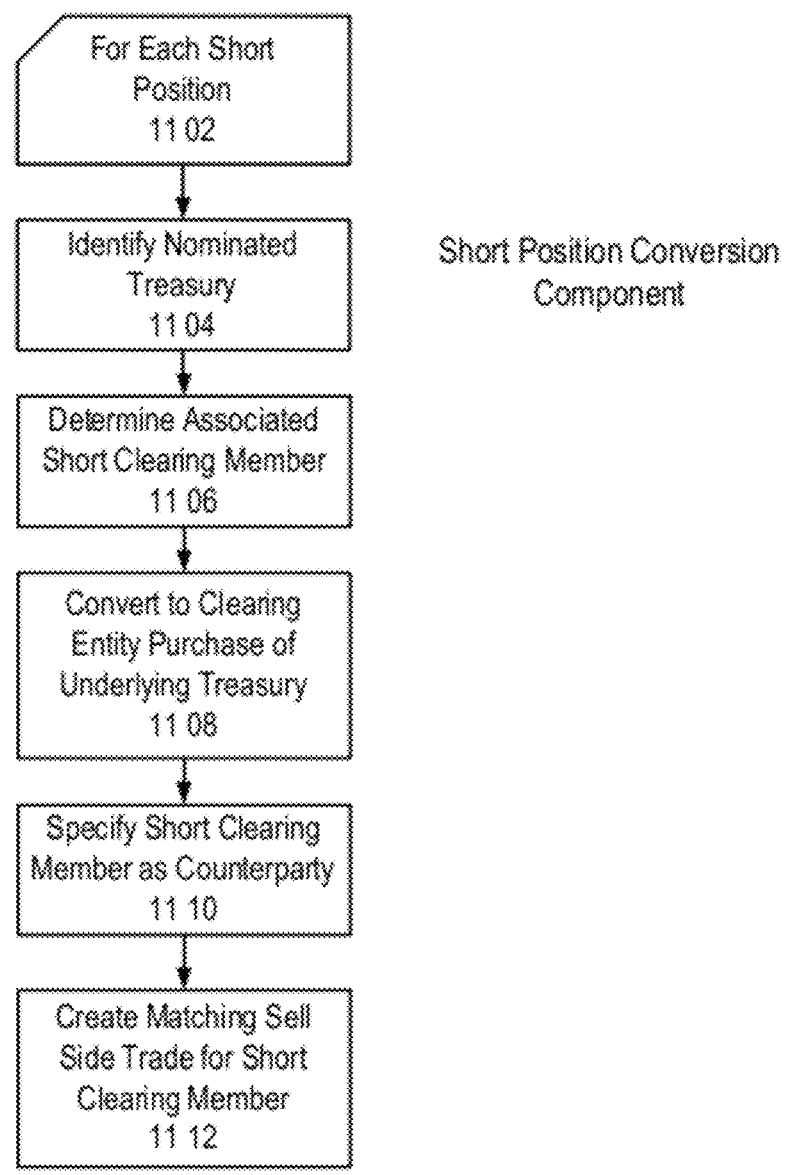
FIG. 11 is a flow diagram illustrating elements of some embodiments of the DTMC ENGINE.

As illustrated in FIG. 11, in one implementation, each short position 1102 may be converted to a Clearing Entity purchase in the underlying treasury 1108 (as defined by the treasury nominated by the short position 1104). The short clearing member 1106 may be listed as the counterparty 1110. A matching sell side trade may be generated/created 1112 for the short clearing member (e.g., via PTFSC systems).

Figure 12:
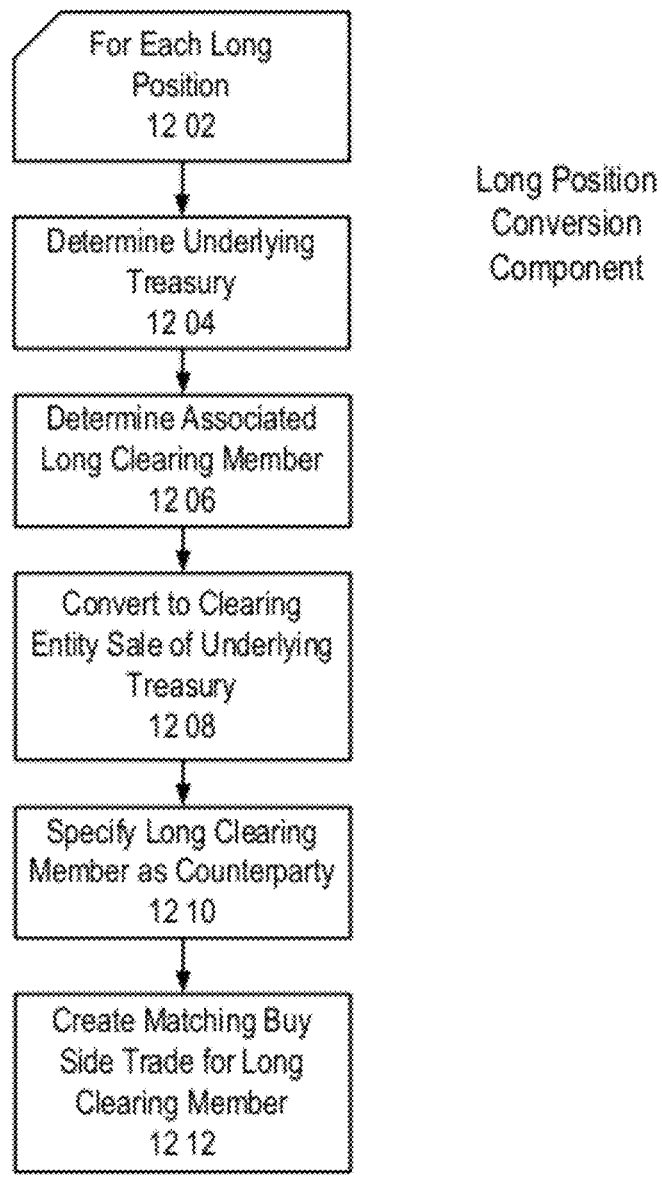
FIG. 12 is of a flow diagram illustrating elements of some embodiments of the DTMC ENGINE.

As illustrated in FIG. 12, in one implementation, for each long position 1202, the underlying treasury may be determined 1204 (e.g., as defined by the allocation algorithm discussed above), the associated long clearing member identified 1206, and the long position may be converted to a Clearing Entity sale in the underlying treasury 1208. The long clearing member may be listed/specified as the counterparty 1210, and PTFSC (and/or other) systems may create a matching buy side trade for the long clearing member 1212.

In some embodiments, positions with a value greater than a specified threshold (e.g., $50 million) may be broken down into multiple trades.

In certain embodiments in which the Clearing Entity acts as a broker and positions may not be directly matched member to member, the DTMC ENGINE may be configured such that some or all trades created on the same trading day in a single treasury note or bond may have to have the same Broker Reference Number ID (and/or like indicia) populated on the cash trade record (and/or like record). In some such implementations, this may allow confirmation (e.g., by PTFSC) to assure that the Clearing Entity half trades balance out to zero for each product.

In some embodiments, PTFSC and/or other systems may add these trades to a net settlement facility. In some instances, trades submitted to the PTFSC are netted, and the Clearing Entity may thus have a net zero position in the PTFSC systems. In such instances, PTFSC may not charge the Clearing Entity for those trades entered with Clearing Entity as the Participant.

In some embodiments, the deal price (principal amount) for each cash trade (e.g., sent to the PTFSC) may be calculated as follows:

Contract Size×DSP(I)×PF and rounded to the nearest cent, where:
Contract=Value of one price point:
Size —$1000 for 5-, 10- and 30-year treasury futures.
   —$2000 for 2-year treasury futures.
DSP(I)=Either:
   (a) The daily settlement price calculated and published by the exchange on Intent Day; or,
   (b) The daily settlement price calculated and published by the exchange on the Last Trading Day if Intent Day is on or after the Last Trading Day.
PF=The Price Factor as described below with respect to the Conversion Factor.

In some implementations, the face value (PAR) for each cash trade (e.g., as sent to the PTFSC) may be calculated as follows:

Contract Value×No. of Lots where:
Contract=Face value of the underlying treasury:
Value —$100,000 for the 5-, 10- and 30-year treasury futures.
   —$200,000 for the 2-year treasury futures.
No. of Lots=Number of futures lots being delivered in the transaction.

In some embodiments, trades may be sent to PTFSC in a single file on a periodic (e.g., daily) basis, while in other embodiments, updates may be sent real-time or near real-time via a communications channel. In some implementations, PTFSC or like systems may calculate the accrued interest and determine the total invoice value.

In some implementations of three-day delivery process embodiments of the DTMC ENGINE, net transfers of securities and cash occur as part of standard PTFSC daily operations on day 3 (T+2, delivery day).

In some implementations, there may be days that the Exchange Entity is open for trading and the Clearing Entity is clearing business but the PTFSC system (e.g., FICC RTTM system) is closed. In such implementations, the DTMC ENGINE may be configured to implement rules in the commodity management system and/or other systems to prevent cash trades being sent to PTFSC on a holiday or with a settlement date which falls on a holiday. For example, in one embodiment, where a Notice day falls on the day prior to a PTFSC holiday, the settlement date specified on the cash trades may be set to the next date that the PTFSC is open. Depending on the implementation, this may be different from the next Exchange Entity and/or Clearing Entity business day.

In some implementations, where a Notice day falls on an PTFSC holiday, a commodity management system matching algorithm may be run on the Notice day but the cash trades produced may be rolled into the file produced on the next PTFSC business day. The settlement date may thus be two business days following the PTFSC holiday. In most implementations, there should be no impact to the delivery cycle when an Intent Day falls on an PTFSC holiday. As an illustrative example, Labor Day falls on Monday 6 Sep. 2010, and suppose the PTFSC is closed on Labor Day but the Exchange Entity and the Clearing Entity are open for trading. One implementation of the DTMC ENGINE may be configured such that the following rules are implemented and applied.

For Notice Day Friday 3 September (Intent Day 2 September), commodity management system may conduct standard matching algorithms on Friday 3 September and produce the standard files and reports. However, applicable rules may specify that cash trades produced on this day have a settlement date of Tuesday 7 September.

For Notice Day Monday 6 September (Intent Day 3 September), rules may specify that the commodity management system conduct standard matching algorithm on Monday 6 September and produce the standard files and reports with the exception of the cash trades file. The applicable rules may specify that trades produced on Monday 6 September be reported to PTFSC in the standard cash trades file produced on Tuesday 7 September in the same file as those trades produced for Notice Day Tuesday 7 September. The settlement date for trades relating to Notice Day Monday 6 September may be set as Wednesday 8 September.

In some embodiments, the DTMC ENGINE facilitates provision, transaction, clearing, settlement, delivery, and/or management of Eurodollar futures and/or like instruments. In one such embodiment, Eurodollar futures may be cash settled on the last trading day according to the EDSP (e.g., as calculated and published by the NYSE). The EDSP may be set via the British Bankers' Association survey of 3-6 month U.S. Dollar LIBOR on the last trading day.

Although contract specifications may vary depending on the implementation, the following provides a non-limiting example of contract terms for Eurodollar Futures:

| Name: | 90 day Eurodollar futures |
| --- | --- |
| Trade Unit: | $1,000,000 USD |
| Tick Size: | One-quarter of one basis point (0.0025 = $6.25 per contract) in the nearest expiring contract month; |
| | One-half of one basis point (0.005 = $12.50 per contract) in other contract months. |
| | The "new" front-month contract begins trading in 0.0025 increments on the trading day following the expiration of the "old" front-month contract. The expiring future ceases trading at 11:00 a.m. London time on the expiring contract month's last trading day. |
| Tick Value | $6.25 in the nearest expiring contract month; $12.50 in other contract months. |
| Point Value | $2,500 |
| Final Settlement Procedure | Cash settled to 100 minus the British Bankers' Association survey of 3-month U.S. Dollar LIBOR on the last trading day. Final settlement price will be rounded to four decimal places, equal to $1/10,000$ of a percent, or $0.25 per contract. |
| Limits/Price Banding: | none |

-continued

| Name: | 90 day Eurodollar futures |
|---|---|
| Trading Hours: | 18:16-16:00 (day + 1) CT |
| Listing Frequency IMM dates out | Quarterly expirations in September, December, March, June. Extending three years. The new contract month terminating 3 years in the future is listed on the Tuesday following expiration of the front quarterly contract month. |
| Block minimum | 10 |
| First Trading Day: | The new contract month terminating 21 months in the future is listed on the Tuesday following expiration of the front quarterly contract month. |
| Last Trading Day: | The second London bank business day prior to the third Wednesday of the contract expiry month. Trading in the expiring contract closes at 11:00 a.m. London Time on the last trading day. |

Although contract specifications may vary depending on the implementation, the following provides a non-limiting example of contract terms for options on Eurodollar futures and mid curve options on Eurodollar futures:

| Name: | 90 day Eurodollar options |
|---|---|
| Trade Unit: | $1,000,000 USD |
| Underlying Instrument | Quarterly Corresponding quarterly Eurodollar futures contract month. Serial Corresponding quarterly Eurodollar futures contract month immediately following the serial (e.g., April serial option underlying is the June futures). Mid Curve One-Year |
| Tick Size: | Quarterly and Serial Quoted in IMM Index points. One-quarter of one basis point (.0025 = $6.25) for options when underlying futures is nearest expiring month, and for the first two quarterly months and the first two serial months when the option premium is below five ticks. One-half of one basis point (0.005 = $12.50) for other contract months. Mid-Curves One-half of one basis point (0.005 = $12.50). |
| Strike Price Interval | Quarterly, Serial and Mid-Curves Strike prices may be listed in intervals of 12.5 basis points (0.125) in a range of 150 basis points above and 150 basis points below the strike closest to the previous day's underlying futures settle price. |
| Last trading day | Quarterly The second London bank business day before the third Wednesday of the contract month. Trading in expiring contracts ceases at 11:00 a.m. London Time on the last trading day. Serial and Mid-Curve The Friday immediately preceding the third Wednesday of the contract month. |
| First trading day | The new contract month is listed on the trading day following the expiry of the front month Option. |
| Exercise | Options are American Style and are exercised by notifying the Clearing House by 19:00 CT on the day of exercise. Unexercised options shall expire at 19:00 CT on the last trading day. In-the-money options that have not been exercised shall be automatically exercised following expiration in the absence of contrary instructions |
| Contract Months | Quarterly Eight quarterly options Serial Two front month serial options Mid-Curve 1-Year Mid-Curve Options: Four quarterlies along with two front month serials. |
| Limits/Price Banding: | none |

In one implementation, trading may cease at a specified time (e.g., 11 am London time) on expiry day, but Members may be permitted to resolve trades and manage their positions until a later specified time (e.g., 10:00 CT). The final expiry process may then be run following this deadline.

In some embodiments, contracts may trade within specified trading times, such as, by way of non-limiting example: Pre-Open: 17:30 CT; Open (futures): 18:16 CT; Open (options): 18:18 CT; Close: 16:00 CT.

In one embodiment, the daily settlement price for fixed income futures may be calculated at a specified time and according to and/or derived/determined from the prices in the futures market. In some implementations, the Daily Settlement price may use the vanilla market price calculations. An EDSP may be calculated by the Exchange Entity operations teams for specific products (e.g., CAT Treasury Futures and Eurodollar futures) at a specified time (e.g., 11:00 London time), according to and/or derived/determined from prices in the underlying markets. In some implementations, input of the EDSP may be automatic, while in other implementations the input of EDSP may be a manual process.

In some embodiments of the DTMC ENGINE, the EDSP may be used for the calculation of the final variation margin and may be used as the price for the cash trades generated as a result of the allocation process. Treasury futures with a basket delivery may use the daily settlement price calculated on the intent day as an EDSP, and there may be no specific EDSP calculated.

In one embodiment, the daily settlement/EDSP futures price may be sent to the PTFSC on a daily basis for input into one or more associated risk management systems.

In some embodiments, daily settlement prices for options on futures may be calculated using the Black-Scholes and/or similar pricing model(s). In some implementations, the options daily settlement price and options volatilities may be sent to the PTFSC on a periodic (e.g., daily) and/or continuous basis for input to the risk management system(s). In some embodiments, the Exchange Entity Database System may be used to produce the prices files in a specified format for distribution/dissemination to the PTFSC.

In one embodiment, strike formats may be specified, e.g., that options strike formats be listed in increments of one-quarter of one point, one-half of one point, in increments of one point, etc.

In some embodiments, the DTMC ENGINE may be configured to support the introduction of new options strikes during the trading day so that they are immediately made available for trading. Such embodiments may be utilized for occasions where there has been significant movement in the underlying market. This functionality may allow the Exchange Entity to ensure there is a sufficient range of strikes above and below the at-the-money strike to meet member trading requirements. Depending on the implementation, an automatic or a manual process may be taken for the introduction of intraday strikes into the PTFSC systems. In some implementations, operational procedures may be specified so that the PTFSC may be informed and the series added manually.

In on embodiment, the DTMC ENGINE may be configured to provide the ability to list strike prices based on zero and negative interest rates for particular products, such as, but not limited to, Eurodollar options. Strike prices may be according to and/or derived/determined from the underlying futures prices which are represented as [100−interest rate], e.g. an interest rate of 3.275% will be represented by a strike price of 96.725. Negative interest rates may imply a price greater than 100, e.g., an interest rate of −0.525 will be represented as a strike price of 100.525. In some embodiments, to support this functionality, a solution, such as using a non numerical representation of the strike price in the AMR, may be implemented.

In some embodiments, one or more fixed income products associated with the DTMC ENGINE may be assigned to a separate subscription group from products cleared through another clearing method and/or clearing entity (e.g., OCC).

In some embodiments, Eurodollar Futures may have both Implied In and Implied Out prices calculated for Butterfly strategies. Implied prices may be created in markets where the Butterfly interacts with the outright market and calendar spreads, for example, in the following manner: (1) implied prices may be generated in markets where a Butterfly combines with two Calendar Spreads; (2) implied prices may be generated in markets where a Butterfly combines with three outrights (i.e., generate implied prices from a butterfly into its middle leg); (3) implied prices ma be generated in markets where a Butterfly combines with two outrights and a Calendar Spread across consecutive legs of the Butterfly; and (4) implied prices may be generated in the outside leg outright where a Butterfly combines with two outrights and a Calendar spread across the outside legs of the Butterfly.

Regulatory Requirements

In some embodiments, the DTMC ENGINE may facilitate compliance with regulatory requirements. One embodiment of the DTMC ENGINE facilitates the generation and/or submission of Exchange Reports.

In one implementation, the DTMC ENGINE facilitates generation and/or provision of CFTC Exchange Reports to the CFTC by the Exchange Entity. A separate CFTC Exchange Report may be produced for Exchange Entity contracts cleared through the Clearing Entity. In some implementations, reports for these contracts may be submitted separately, while in other implementations, these contracts may be added to the same CFTC Exchange Report as contracts cleared through another clearing mechanism (e.g., OCC). In one implementation, the data for the Clearing Entity cleared contracts may be sourced entirely from exchange technologies systems. The DTMC ENGINE may be configured to generate reports in specified formats that meet reporting requirements. For example, the records that may be required by the CFTC are: 100A: Member ID; 110C: Positions, Contracts Bought/Sold; 111F: EFPs Bought/Sold, Delivery Notices Issued/Stopped; 200B: Product Listing: Option Series/Future Month; 210D: Trading Volume, EFP Volume, Open Interest; 220F: Session, Opening Period, Closing Period and High/Low prices & Settlement Price. In some implementations, the National Futures Association and/or other organization (hereinafter "NFA") that conducts trade practice surveillance and market surveillance activities on behalf of an Exchange Entity may also provide reports to the CFTC. The NFA will continue to provide other reports for Exchange Entity directly to the CFTC.

In some embodiments, the DTMC ENGINE facilitates generation and/or submission of Exchange Entity clearing reports produced for the Clearing Entity cleared contracts and sent to the NFA: Exercise & Assignments; Positions; Gross Position Adjustments; Transfers/Adjustments; Allocations; Trades; Settlement Activity; and/or the like.

The DTMC ENGINE may, in some embodiments, facilitate Clearing Member Reports. Clearing member reports may be produced for a Clearing Entity by TRS/CPS and/or like systems. In some implementations, the clearing house name, branding and legal text may be updated appropriately for the Clearing Entity. Similarly, exchange name, branding and legal text may be updated appropriately for the Exchange Entity. Reports may include, but are not limited to, one or more of the following: Clearing Member Report (CMR); Daily Activity Report (DAR); Daily Broked In (DBI); Daily Brokerage Report (DBR); Members Position Report (DPR); Daily Traded Volume (DTV); In the Money Options (IMO); Members Pending Delivery (MPD); Members Trade Statement (MTS); Members Trade Summary Statement (MTS_SUMMARY); Position Transfer Report (PTR); and/or one or more like reports.

The DTMC ENGINE may, in some embodiments, facilitate Exchange Reports, such as, by way of non-limiting example: Open Interest Summary (OPS); Valid Series Listing (SERIES); Trading Volume by Series (VOL); Half Trade Allocation Type (ALC); Half Trade Allocation Type Summary (ALS); Block Trade Report (BLCK); End of Day Defaulting Report (DEF); Deregistration Exception Report (DEREG); Price Exception Report (EXCEPTION); Unresolved Kerb Trade Report (KDEF); Kerb Slips Report (KERB); Delivery Pending Report (LCHSPD); Allocation Problems (UC) (MMC); Allocation Problems (PS) (MMP); Allocation Problems (AP) (MMR); Allocation Problems (UT) (MMT); Members Trading Statement (MTS); Open Interest Report by Member (OPM); Recreations (REC); Resulting Futures Report (RFR); Daily Activity Report (SAR); Daily Pending Report (SPD); Settlements Report (STL); Summary of Transfers (STR); Exchange-wide Matched Trade Report (TTR); Volatility Slips Report (VOLSLIPS); and/or the like.

The DTMC ENGINE may, in some embodiments, facilitate Large Trader Reports. In some implementations, clearing members may submit separate Large Trader Reports (LTR) for the Clearing Entity markets. These reports may be sent to the NFA and/or like entities. Some embodiments the DTMC ENGINE facilitate Clearing Entity risk management to view total positions for each individual trader. As such, Large Trader Risk reports may be produced detailing the total position held by each trader across the Clearing Members. In some implementations, the identity of each trader is specified on form 102, submitted to the NFA. The ID and the position held may then be specified on LTRs submitted by Clearing Members. The Large Trader Risk report may show an aggregated position for each trader by cross referencing the details against the details on the form 102*s*.

In some embodiments, the DTMC ENGINE facilitates End of Day Files/Daily Information Sheets. In one implementation, one or more of the following end of day files may be produced for the Clearing Entity cleared contracts traded on an Exchange Entity market: Fixed Income Futures Summary; Fixed Income Options Summary; Fixed Income Futures Price History; Fixed Income Options Price History; and/or the like.

In some embodiments, Exchange Entity contracts cleared through the Clearing Entity may be displayed on an Exchange Entity Volume Summary sheet alongside the alternatively cleared contracts.

Some embodiments may facilitate one or more of the following delivery reports: Daily Issues and Stops Report; Daily Delivery Detail Report; Month to Date Report; Year to Date Report; and/or the like. In some embodiments, a report showing the calculated conversion factors (as described below) may be facilitated for each of the CUSIPs eligible for delivery under the Exchange Entity treasury futures.

In some embodiments, the Conversion Factor may be calculated in accordance with the formula:

$$PF = a \times \left[\frac{f}{2} + c + d\right] - b$$

where:

f=the bond's annual coupon in decimals.

n=the number of whole years from the first day of the delivery month to the maturity (or call) date of the bond or note.

z=is the number of whole months between n and the maturity date rounded down to the nearest quarter for the 10-Year U.S. Treasury Note and 30-Year U.S. Treasury Bond futures contracts, and to the nearest month for the 2-Year, 3-Year and 5-Year U.S. Treasury Note futures contracts.

v=z if z<7
3 if z≥7, for 10-year and 30-year treasuries
z−6 if z≥7, for 2-year, 3-year and 5-year treasuries $$a = \frac{1}{1.03^{\frac{v}{6}}}$$

$$b = \frac{\left(\frac{f}{2}\right) \times (6 - v)}{6}$$

$$c = \frac{1}{1.03^{2n}} \text{ if } z < 7$$

$$\frac{1}{1.03^{2n+1}} \text{ if } z \geq 7$$

$$d = \frac{f}{0.06} \times (1 - c)$$

In some embodiments of the DTMC ENGINE, the Accrued Interest may be determined as follows:
(i) If the first day of the delivery month occurs in a standard coupon period, and:
   a. the first day of the delivery month occurs on or before the ex-dividend date (i.e., two trading days before the record date):

$$AI = \frac{t}{s} \times \frac{c}{2}$$

b. the first day of the delivery month occurs after the ex-dividend date:

$$AI = \left(\frac{t}{s} - 1\right) \times \frac{c}{2}$$

where:
AI=Accrued Interest per $100 nominal of the treasury;
c=Annual coupon per $100 nominal of the treasury;
t=Number of calendar days from and including the last coupon date up to but excluding the first day of the delivery month;
s=Number of calendar days in the full coupon period in which the first day of the delivery month occurs;
(ii) If the first day of the delivery month occurs in a short first coupon period, and:
   a. the first day of the delivery month occurs on or before the ex-dividend date:

$$AI = \frac{t^*}{s} \times \frac{c}{2}$$

b. the first day of the delivery month occurs after the ex-dividend date:

$$AI = \frac{t^* - r}{s} \times \frac{c}{2}$$

where:
t*=Number of calendar days from and including the issue date up to but excluding the first day of the delivery month;

r=Number of calendar days from and including the issue date up to but excluding the next 11 quasi-coupon date; and c and s have the same meanings as in (i) above.

(iii) If the first day of the delivery month occurs in a long first coupon period, and:
  a. the first day of the delivery month occurs during the first full coupon period:

$$AI = \frac{u}{s_1} \times \frac{c}{2}$$

b. the first day of the delivery month occurs during the second full coupon period and on or before the ex-dividend date:

$$AI = \left(\frac{r_1}{s_1} + \frac{r_2}{s_2}\right) \times \frac{c}{2}$$

c. the first day of the delivery month occurs during the second full coupon period and after the ex-dividend date:

$$AI = \left(\frac{r_2}{s_2} - 1\right) \times \frac{c}{2}$$

where:
u=Number of calendar days from and including the issue date up to but excluding the first day of the delivery month;
$s_1$=Number of calendar days in the full coupon period in which the issue date occurs;
$s_2$=Number of calendar days in the next full coupon period after the full coupon period in which the issue date occurs;
$r_1$=Number of calendar days from and including the issue date up to but excluding the next quasi-coupon date;
$r_2$=Number of calendar days from and including the quasi-coupon date after the issue date up to but excluding the first day of the delivery 12 month which falls in the next full coupon period after the full coupon period in which the issue date occurs;
and c has the same meaning as in (i) above.

The above-provided descriptions are non-limiting illustrations of aspects and implementations of various embodiments of the DTMC ENGINE.

In some embodiments, the DTMC ENGINE may be implemented as a DTMC ENGINE system. A DTMC ENGINE system may include a number of operational modules and/or data stores configured to carry out and/or support DTMC ENGINE features and/or functionality. A DTMC ENGINE controller may serve a central role in some embodiments of DTMC ENGINE operation, serving to orchestrate the reception, generation, and distribution of data and/or instructions to, from, and between DTMC ENGINE modules and/or allow further review/analysis of data generated and/or gathered during DTMC ENGINE operation. The DTMC ENGINE controller may be coupled to one or more operation modules configured to implement various features associated with embodiments of DTMC ENGINE operation.

In one embodiment, the DTMC ENGINE controller may be coupled to a market and/or exchange interface configured to: query and/or receive market and/or exchange data from one or more data sources or feeds; effectuate orders and/or transactions; receive confirmations and/or fulfillment notifications; and/or the like.

In one implementation, the DTMC ENGINE controller may also be coupled to a DTMC ENGINE output interface, which may be configured to publish and/or transmit information, data, and/or reports to internal or external systems, components, and/or entities. In a further implementation, the DTMC ENGINE controller may be coupled to one or more administrator interfaces and/or administration components, configured to provide an interface via which an administrator can monitor and/or interact with DTMC ENGINE system settings, actions, rules, data management, and/or the like. For example, in one implementation, a DTMC ENGINE administrator may interface with the DTMC ENGINE system via an administrator user interface to adjust transaction rules, update chronological information, adjust user permissions, and/or the like within a given application or tool of the DTMC ENGINE system.

In one implementation, the DTMC ENGINE controller may be coupled to a transaction module configured to record contract purchase details, including, by way of non-limiting example: purchase date and/or time information, term information, exchange information, position information, volume information, member/user information, and/or the like. The transaction module (and/or a related module) may be configured to receive inputs and/or requests, via specified channels and/or user interfaces, such as short position delivery intents and/or instrument nominations provided by exchange members via a member interface. In some implementations, the controller may be coupled to a user interface module to provide appropriate user interfaces to exchange member and/or other users to allow interaction with and utilization of the DTMC ENGINE. The transaction module (and/or related module(s)) may also be configured to process transactions, including but not limited to: aggregating delivery intents, determining positions (or a collection or pool thereof) that will take delivery, generating a positions record, and/or the like.

DTMC Engine Controller

Figure 13:
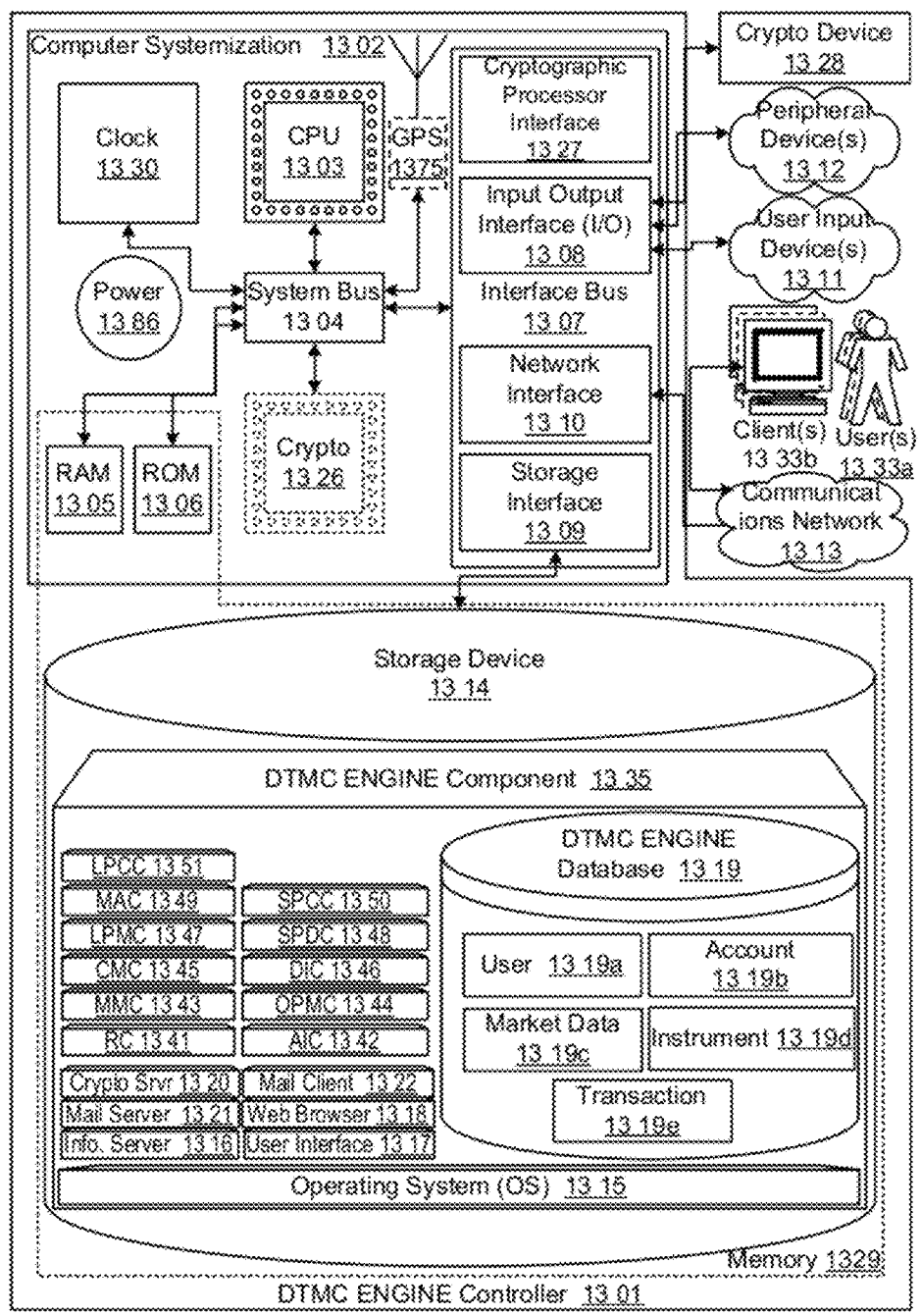
FIG. 13 is of a block diagram illustrating embodiments of the DTMC ENGINE controller.

FIG. 13 shows a block diagram illustrating embodiments of a DTMC ENGINE controller. In this embodiment, the DTMC ENGINE controller 1301 may serve to aggregate, process, store, search, serve, identify, instruct, generate, match, and/or facilitate interactions with a computer through secure finance, trading, and/or data management technologies, and/or other related data.

Typically, users, which may be people and/or other systems, may engage information technology systems (e.g., computers) to facilitate information processing. In turn, computers employ processors to process information; such processors 1303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DTMC ENGINE controller 1301 may be connected to and/or communicate with entities such as, but not limited to: one or more users from user input devices 1311; peripheral devices 1312; an optional cryptographic processor device 1328; and/or a communications network 1313.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DTMC ENGINE controller 1301 may be based on computer systems that may comprise, but are not limited to, components such as: a computer systemization 1302 connected to memory 1329.

Computer Systemization

A computer systemization 1302 may comprise a clock 1330, central processing unit ("CPU(s)" and/or "processor(s)" (these terms are used interchangeable throughout the disclosure unless noted to the contrary)) 1303, a memory 1329 (e.g., a read only memory (ROM) 1306, a random access memory (RAM) 1305, etc.), and/or an interface bus 1307, and most frequently, although not necessarily, are all interconnected and/or communicating through a system bus 1304 on one or more (mother)board(s) 1302 having conductive and/or otherwise transportive circuit pathways through which instructions (e.g., binary encoded signals) may travel to effectuate communications, operations, storage, etc. The computer systemization may be connected to a power source 1386; e.g., optionally the power source may be internal. Optionally, a cryptographic processor 1326 and/or transceivers (e.g., ICs) 1374 may be connected to the system bus. In another embodiment, the cryptographic processor and/or transceivers may be connected as either internal and/or external peripheral devices 1312 via the interface bus I/O. In turn, the transceivers may be connected to antenna(s) 1375, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing DTMC ENGINE controller to determine its location)); Broadcom BCM4329FKUBG transceiver chip (e.g., providing 802.11n, Bluetooth 2.1+ EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code)

according to conventional data processing techniques. Such instruction passing facilitates communication within the DTMC ENGINE controller and beyond through various interfaces. Should processing requirements dictate a greater amount speed and/or capacity, distributed processors (e.g., Distributed DTMC ENGINE), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the DTMC ENGINE may be achieved by implementing a microcontroller such as CAST's R8051XC2 microcontroller; Intel's MCS 51 (i.e., 8051 microcontroller); and/or the like. Also, to implement certain features of the DTMC ENGINE, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DTMC ENGINE component collection (distributed or otherwise) and/or features may be implemented via the microprocessor and/or via embedded components; e.g., via ASIC, coprocessor, DSP, FPGA, and/or the like. Alternately, some implementations of the DTMC ENGINE may be implemented with embedded components that are configured and used to achieve a variety of features or signal processing.

Depending on the particular implementation, the embedded components may include software solutions, hardware solutions, and/or some combination of both hardware/software solutions. For example, DTMC ENGINE features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DTMC ENGINE features. A hierarchy of programmable interconnects allow logic blocks to be interconnected as needed by the DTMC ENGINE system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DTMC ENGINE may be developed on regular FPGAs and then migrated into a fixed version that more resembles ASIC implementations. Alternate or coordinating implementations may migrate DTMC ENGINE controller features to a final ASIC instead of or in addition to FPGAs. Depending on the implementation all of the aforementioned embedded components and microprocessors may be considered the "CPU" and/or "processor" for the DTMC ENGINE.

Power Source

The power source 1386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1386 is connected to at least one of the interconnected subsequent components of the DTMC ENGINE thereby providing an electric current to all subsequent components. In one example, the power source 1386 is connected to the system bus component 1304. In an alternative embodiment, an outside power source 1386 is provided through a connection across the I/O 1308 interface. For example, a USB and/or IEEE 1394 connection carries both data and power across the connection and is therefore a suitable source of power.

Interface Adapters

Interface bus(ses) 1307 may accept, connect, and/or communicate to a number of interface adapters, conventionally although not necessarily in the form of adapter cards, such as but not limited to: input output interfaces (I/O) 1308, storage interfaces 1309, network interfaces 1310, and/or the like. Optionally, cryptographic processor interfaces 1327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1309 may accept, communicate, and/or connect to a number of storage devices such as, but not limited to: storage devices 1314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1310 may accept, communicate, and/ or connect to a communications network 1313. Through a communications network 1313, the DTMC ENGINE controller is accessible through remote clients 1333$b$ (e.g., computers with web 22 browsers) by users 1333$a$. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DTMC ENGINE), architectures may similarly be employed to pool, load balance, and/or otherwise increase the communicative bandwidth required by the DTMC ENGINE controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1310 may be used to engage with various communications network types 1313. For example, multiple network interfaces may be employed to allow for the communication over broadcast, multicast, and/or unicast networks.

Input Output interfaces (I/O) 1308 may accept, communicate, and/or connect to user input devices 1311, peripheral devices 1312, cryptographic processor devices 1328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1311 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1312 may be connected and/or communicate to I/O and/or other facilities of the like such as network interfaces, storage interfaces, directly to the interface bus, system bus, the CPU, and/or the like. Peripheral devices may be external, internal and/or part of the DTMC ENGINE controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DTMC ENGINE controller may be embodied as an embedded, dedicated, and/or monitor-less (i.e., headless) device, wherein access would be provided over a network interface connection.

Cryptographic units such as, but not limited to, microcontrollers, processors 1326, interfaces 1327, and/or devices 1328 may be attached, and/or communicate with the DTMC ENGINE controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1329. However, memory is a fungible technology and resource, thus, any number of memory embodiments may be employed in lieu of or in concert with one another. It is to be understood that the DTMC ENGINE controller and/or a computer systemization may employ various forms of memory 1329. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1329 will include ROM 1306, RAM 1305, and a storage device 1314. A storage device 1314 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1329 may contain a collection of program and/or database components and/or data such as, but not limited to: operating system component(s) 1315 (operating system); information server component(s) 1316 (information server); user interface component(s) 1317 (user interface); Web browser component(s) 1318 (Web browser); database(s) 1319; mail server component(s) 1321; mail client component(s) 1322; cryptographic server component(s) 1320 (cryptographic server); the DTMC ENGINE component(s) 1335; and/or the like (i.e., collectively a component collection). These components may be stored and accessed from the storage devices and/or from storage devices accessible through an interface bus. Although non-conventional program components such as those in the component collection, typically, are stored in a local storage device 1314, they may also be loaded and/or stored in memory such as: peripheral devices, RAM, remote storage facilities through a communications network, ROM, various forms of memory, and/or the like.

Operating System

The operating system component 1315 is an executable program component facilitating the operation of the DTMC ENGINE controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DTMC ENGINE controller to communicate with other entities through a communications network 1313. Various communication protocols may be used by the DTMC ENGINE controller as a subcarrier transport mechanism for interaction, such as, but not limited to: multicast, TCP/IP, UDP, unicast, and/or the like.

Information Server

An information server component 1316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DTMC ENGINE controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DTMC ENGINE database 1319, operating systems, other program components, user interfaces, Web browsers, and/or the like.

Access to the DTMC ENGINE database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DTMC ENGINE. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DTMC ENGINE as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1318 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DTMC ENGINE enabled nodes. The combined application may be nugatory on systems employing standard Web browsers.

Mail Server

A mail server component 1321 is a stored program component that is executed by a CPU 1303. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DTMC ENGINE.

Access to the DTMC ENGINE mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1322 is a stored program component that is executed by a CPU 1303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1320 is a stored program component that is executed by a CPU 1303, cryptographic processor 1326, cryptographic processor interface 1327, cryptographic processor device 1328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DTMC ENGINE may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DTMC ENGINE component to engage in secure transactions if so desired. The cryptographic component facilitates the secure accessing of resources on the DTMC ENGINE and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DTMC Engine Database

The DTMC ENGINE database component 1319 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DTMC ENGINE database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DTMC ENGINE database is implemented as a data-structure, the use of the DTMC ENGINE database 1319 may be integrated into another component such as the DTMC ENGINE component 1335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1319 includes several tables 1319a-e. A user table 1319a includes fields such as, but not limited to: an user_id, user_authorization, user_status, user_profile, user_instruments, member_id, member_account, customer_id, customer_account, and/or the like. The user table may support and/or track multiple entity accounts on a DTMC ENGINE. An account table 1319b includes fields such as, but not limited to: an account_id, account_authorization, account_status, account_profile, account_instruments, and/or the like. A market data table 1319c includes fields such as, but not limited to: market_data_feed_ID, asset_ID, asset_symbol, asset_name, spot_price, bid_price, ask_price, contract_info, and/or the like; in one embodiment, the market data table is populated through a market data feed (e.g., Bloomberg's PhatPipe, Dun & Bradstreet, Reuter's Tib, Triarch, NYSE Liffe U.S. market data feed, etc.), for example, through Microsoft's Active Template Library and Dealing Object Technology's real-time toolkit Rtt.Multi. A instrument table 1319d includes fields such as, but not limited to: instrument_id, instrument_details, instrument_specification, instrument_term, and/or the like. A transaction table 1319e includes fields such as, but not limited to: transaction_id, transaction_parties, transaction_profile, transaction_details, transaction_instrument, transaction_status, and/or the like.

In one embodiment, the DTMC ENGINE database may interact with other database systems. For example, employing a distributed database system, queries and data access by search DTMC ENGINE component may treat the combination of the DTMC ENGINE database, an integrated data security layer database as a single database entity.

In one embodiment, user programs may contain various user interface primitives, which may serve to update the DTMC ENGINE. Also, various accounts may require custom database tables depending upon the environments and the types of clients the DTMC ENGINE may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1319a-e. The DTMC ENGINE may be configured to keep track of various settings, inputs, and parameters via database controllers.

The DTMC ENGINE database may communicate to and/or with other components in a component collection, including itself, and/or facilities of the like. Most frequently, the DTMC ENGINE database communicates with the DTMC ENGINE component, other program components, and/or the like. The database may contain, retain, and provide information regarding other nodes and data.

The DTMC Engines

The DTMC ENGINE component 1335 is a stored program component that is executed by a CPU. In one embodiment, the DTMC ENGINE component incorporates any and/or all combinations of the aspects of the DTMC ENGINE that was discussed in the previous figures. As such, the DTMC ENGINE affects accessing, obtaining and the provision of information, services, transactions, and/or the like across various communications networks.

The DTMC ENGINE transforms membership and product code synchronization data, prices & options settlement data, position snapshots data, expiry positions (cash trades) data, daily mark-to-market cashflow data and, periodic (e.g., monthly) trading & clearing fees data inputs via DTMC ENGINE components Reconciliation Component (RC) 1341, Adjustment Interface Component (AIC) 1342, Margin Maintenance Component (MMC) 1343, Open Position Maintenance Component (OPMC) 1344, Contract Maintenance Component (CMC) 1345, Delivery Initiation Component (DIC) 1346, Long Position Maintenance Component (LPMC) 1347, Short Position Delivery Component (SPDC) 1348, Matching/Allocation Component (MAC) 1349, Short Position Conversion Component (SPCC) 1350, and Long Position Conversion Component (LPCC) 1351 into transaction processing outputs.

The DTMC ENGINE component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DTMC ENGINE server employs a cryptographic server to encrypt and decrypt communications. The DTMC ENGINE component may communicate to and/or with other components in a component collection, including itself, and/or facilities of the like. Most frequently, the DTMC ENGINE component communicates with the DTMC ENGINE database, operating systems, other program components, and/or the like. The DTMC ENGINE may contain, communicate, generate, obtain, and/or provide program component, system, user, and/or data communications, requests, and/or responses.

Distributed DTMC Engines

The structure and/or operation of any of the DTMC ENGINE node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DTMC ENGINE controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DTMC ENGINE controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); //
access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for APPARATUSES, METHODS AND SYSTEMS FOR A DYNAMIC TRANSACTION MANAGEMENT AND CLEARING ENGINE (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DTMC ENGINE individual and/or enterprise user, database configuration and/or relational model, data type, data transmission and/or network framework, syntax structure, and/or the like, various embodiments of the DTMC ENGINE, may be implemented that enable a great deal of flexibility and customization. For example, aspects of the DTMC ENGINE may be adapted for institutional or independent exchanges, and/or web-based services. While various embodiments and discussions of the DTMC ENGINE have been directed to implementations in exchanges and financial institutions, however, it is to be understood that the embodiments described herein may be readily configured and/or customized for a wide variety of other applications and/or implementations.

What is claimed is:

1. A computer-implemented method for reducing computational processing and operational requirements of a post-trade financial services entity, the method comprising:

in a networked system comprising one or more data sources, at least one computer device, the post-trade financial services entity and a dynamic transaction management and clearing (DTMC) engine communicatively coupled to said one or more data sources and said at least one computer device, said DTMC engine comprising one or more components instantiated on a single node or across numerous nodes of the networked system to improve performance through at least one of load-balancing and data-processing techniques, said one or more components comprising an interaction gateway, a user interface module, a non-transitory memory storing processing instructions and at least one processor executing said processing instructions to cause the DTMC engine to perform the steps of:

receiving, from the one or more data sources over the network, contract purchase details for a plurality of contract purchases, each contract (i) having a specified term and (ii) trading on an exchange, the contract purchase details comprising position volume and purchase volume, for each of a plurality of exchange members;

recording the contract purchase details;

receiving, over the network via the interaction gateway, one or more short position delivery intents from the at least one computer device, said at least one computer device being associated with at least one exchange member among the plurality of exchange members having short positions;

in response to receiving the one or more short position delivery intents, automatically generating, by the user interface module of the DTMC engine, a user interface that is displayed on the at least one computer device associated with the at least one exchange member, the user interface comprising selectable financial instruments available for delivery, the selectable financial instruments corresponding to financial instruments held by the post-trade financial services entity and associated with a contract for the respective exchange member;

receiving, via the user interface from the at least one computer device, a selection indicating an instrument nomination from among the selectable financial instruments for each received short position delivery intent, the instrument nomination specifying a financial instrument that is to be delivered by a respective associated exchange member;

automatically aggregating the received short position delivery intents to create aggregated short position delivery intents;

automatically generating a pool of long positions that will take delivery of short positions associated with the aggregated short position delivery intents;

automatically generating a delivered positions record comprising details for the short positions associated with the aggregated short position delivery intents, the pool of long positions that will take delivery and the instrument nomination, the DTMC engine transmitting the delivered positions record to the post-trade financial services entity; and automatically generating one or more trades based on the generated delivered positions record.

2. The method of claim 1, wherein a received short position delivery intent includes an instrument nomination.

3. The method of claim 1, further comprising:

providing, via the user interface module of the DTMC engine, the selectable financial instruments as a drop down list in the user interface of the computer device.

4. The method of claim 3, wherein the user interface providing the selectable financial instruments includes CUSIP information.

5. The method of claim 3, wherein the user interface providing the selectable financial instruments includes coupon rate information.

6. The method of claim 3, wherein the user interface providing the selectable financial instruments includes maturity information.

7. The method of claim 3, wherein the selectable financial instruments are limited to financial instruments that are deliverable under the terms of a contract associated with the short position delivery intent.

8. The method of claim 1, wherein automatically generating the pool of long positions that will take delivery of the short positions associated with the aggregated short position delivery intents comprises:

determining a trading volume assigned to each trading date for each exchange member, the determination comprising:

sorting a set of volumes associated with long positions by trading date, and selecting, starting with a latest trading date, each trading date sequentially until the long position for that member has been satisfied;

grouping long positions by trading date; and adding long positions for each trading date to the pool of long positions until the total long positions satisfy the total short positions.

9. The method of claim 8, wherein when the total volume of a trading date is greater than required, positions within a trading date are selected using a pro-rata algorithm.

10. The method of claim 1, further comprising matching deliveries with buyers in the pool of long positions.

11. The method of claim 10, wherein the matching of deliveries with buyers is matching via a random strip algorithm.

12. The method of claim 10, wherein the nominated financial instruments are bonds, further comprising:
ordering long clearing member accounts;
randomly selecting an account as a starting account from the ordered accounts; and
allocating a lowest coupon bond to the starting account and accounts following the starting account according to the order and continuing the allocation of the next lowest coupon bond once the lowest coupon bond has been allocated and continuing until all bonds have been allocated.

13. The method of claim 12, wherein when bonds of equal coupon but different maturity dates have been nominated, allocating bonds with an earlier maturity date before allocating bonds with a later maturity date.

14. The method of claim 1, further comprising:
converting each short position into a clearing entity purchase in an underlyer, the underlyer corresponding to the financial instrument specified by the instrument nomination associated with the respective short position; and
converting each long position into a clearing entity sale in an underlyer, the underlyer determined by an allocation process.

15. An exchange delivery system, comprising:
one or more computer components instantiated on a single node or across numerous nodes of a networked system for improving performance of the exchange delivery system through at least one of load-balancing and data-processing techniques, said one or more components comprising:
means to receive and record contract purchase details for contract purchases from one or more data sources over a network, a contract (i) having a specified term and (ii) trading on an exchange, the contract purchase details comprising position volume and purchase volume, for each of a plurality of exchange members;
means to receive over the network via an interaction gateway, one or more short position delivery intents from at least one computer device associated with at least one exchange member among the plurality of exchange members having short positions;
means to automatically generate, in response to receiving the one or more short position delivery intents, a user interface that is displayed on the at least one computer device associated with the at least one exchange member, the user interface comprising selectable financial instruments available for delivery, the selectable financial instruments corresponding to financial instruments held by a post-trade financial services entity and associated with a contract for the respective exchange member;
means to receive, via the user interface from the computer device, a selection indicating an instrument nomination from among the selectable financial instruments for each received short position delivery intent, the instrument nomination specifying a financial instrument that is to be delivered by a respective associated exchange member;
means to automatically aggregate the received short position delivery intents to create aggregated short position delivery intents;
means to automatically generate a pool of long positions that will take delivery of short positions associated with the aggregated short position delivery intents;
means to automatically generate a delivered positions record comprising details for short positions associated with the aggregated short position delivery intents, the pool of long positions that will take delivery and the instrument nomination;
means to transmit the delivered positions record to the post-trade financial services entity; and
means to automatically generate one or more trades based on the generated delivered positions record.

16. The system of claim 15, further comprising:
means to provide the selectable financial instruments as a drop down list in the user interface of the computer device.

17. A computer-implemented method for facilitating cross margining between an exchange and a post-trade financial services entity in a networked system comprising one or more data sources, at least one computer device and a dynamic transaction management and clearing (DTMC) engine communicatively coupled to said one or more data sources and said at least one computer device, said DTMC engine comprising one or more components instantiated on a single node or across numerous nodes of the networked system to improve performance through at least one of load-balancing and data-processing techniques, said one or more components comprising an interaction gateway, a user interface module, a non-transitory memory storing processing instructions and at least one processor executing said processing instructions, the method comprising:
receiving, by the DTMC engine, from the one or more data sources over the network, contract purchase details for contract purchases associated with a basket of treasury securities for a plurality of exchange members associated with the exchange, each contract (i) having a specified term and (ii) trading on the exchange, the contract purchase details comprising position volume and purchase volume, for each of a plurality of trading dates throughout the specified term, the DTMC engine comprising a non-transitory memory and at least one processor disposed in communication with said memory, the at least one processor configured to execute processing instructions stored in said memory;
recording, by the DTMC engine, the contract purchase details;
receiving, by the DTMC engine over the network via the interaction gateway, one or more short position delivery intents from the at least one computer device, said at least one computer device being associated with at least one exchange member among the plurality of exchange members having short positions;
in response to receiving the one or more short position delivery intents, automatically generating, by the user interface module of the DTMC engine, a user interface that is displayed on the at least one computer device associated with the at least one exchange member, the user interface comprising selectable treasury securities available for delivery, the selectable treasury securities corresponding to treasury securities held by the post-trade financial services entity and associated with the respective exchange member, the user interface providing CUSIP information, coupon rate information, and maturity information for the selectable treasury securities, the selectable treasury securities limited to treasury securities that are deliverable under the terms of a contract associated with the short position;
receiving, by the DTMC engine, via the user interface from the at least one computer device, a selection indicating an instrument nomination from among the selectable treasury securities for each received short position delivery intent, the instrument nomination specifying the at least one treasury security that is to be delivered by a respective associated exchange member;

automatically aggregating, by the DTMC engine, the received short position delivery intents to create aggregated short position delivery intents;

automatically generating, via the DTMC engine, a pool of long positions that will take delivery of short positions associated with the aggregated short position delivery intents by comparing short positions associated with the aggregated short position delivery intents to long positions;

automatically matching, by the DTMC engine, deliveries with buyers in the pool of long positions;

automatically converting, by the DTMC engine, each short position into a clearing entity purchase in an underlying security, the underlying security corresponding to the at least one treasury security specified by the instrument nomination associated with the short position;

automatically converting, by the DTMC engine, each long position into a clearing entity sale in an underlying security, the underlying security determined by an allocation process; and automatically reconciling, by the DTMC engine, accounts and transferring securities for delivery; and automatically generating, by the DTMC engine, one or more trades based on at least one of the clearing entity purchase and the clearing entity sale.

18. The method of claim 17, wherein automatically generating the pool of long positions that will take delivery of the short positions comprises:

determining a trading volume assigned to each trading date for each exchange member, the determination comprising:

sorting a set of determined volumes associated with long positions by trading date, and selecting, starting with the latest trading date, each trading date sequentially until the long position for that member has been satisfied;

grouping long positions by trading date; and adding long positions for each trading date to the pool of long positions until the total long positions satisfy the total short positions, wherein when the total volume of a trading date is greater than required, selecting positions within a trading date via a pro-rata algorithm.

19. The method of claim 17, wherein automatically matching deliveries with buyers in the long position pool comprises:

ordering long clearing member accounts;

randomly selecting an account as a starting account from the ordered accounts; and allocating a lowest coupon security to the starting account and subsequently to accounts following the starting account according to the order and continuing the allocation of the next lowest coupon security once the lowest coupon security has been allocated and continuing until all securities have been allocated, wherein when securities of equal coupon but different maturity have been nominated, allocating securities with the earliest maturity prior to allocating securities with later maturity.

20. A financial instrument exchange apparatus, comprising:

a dynamic transaction management and clearing (DTMC) engine comprising one or more components instantiated on a single node or across numerous nodes in a network to improve performance through at least one of load-balancing and data-processing techniques, said one or more components comprising:

an interaction gateway;

a user interface module;

a memory; and at least one processor disposed in communication with said memory, and configured to execute a plurality of processing instructions stored in the memory, wherein the at least one processor executes instructions to cause the DTMC engine to:

receive, from one or more data sources over the network, contract purchase details for contract purchases, a contract (i) having a specified term and (ii) trading on an exchange, the contract purchase details comprising position volume and purchase volume, for each of a plurality of exchange members associated with the exchange, for each of a plurality of trading dates throughout the specified term;

record contract purchase details;

receive, over the network via the interaction gateway, one or more short position delivery intents from at least one computer device associated with at least one exchange member among the plurality of exchange members having short positions;

in response to receiving the one or more short position delivery intents, automatically generate, by the user interface module, a user interface that is displayed on the at least one computer device associated with the at least one exchange member, the user interface comprising selectable financial instruments available for delivery, the selectable financial instruments corresponding to financial instruments held by a post-trade financial services entity and associated with a contract for the respective exchange member;

receive, via the user interface from the at least one computer device, a selection indicating an instrument nomination from among the selectable financial instruments for each received short position delivery intent, the instrument nomination specifying a financial instrument that is to be delivered by a respective associated exchange member;

automatically aggregate received short positions delivery intents to create aggregated short position delivery intents;

automatically generate a pool of long positions that will take delivery of short positions associated with the aggregated short position delivery intents; and automatically generate at least one delivered positions record comprising details for the short positions associated with the aggregated short positions delivery intents, the pool of long positions that will take delivery and the instrument nomination, the DTMC engine transmitting the delivered positions record to the post-trade financial services entity; and automatically generate one or more trades based on the generated delivered positions record.

21. The apparatus of claim 20, wherein a received short position delivery intent includes at least one instrument nomination.

22. The apparatus of claim 20, wherein the processor further executes instructions to:

provide, via the user interface module of the DTMC engine, the selectable financial instruments as a drop down list in the user interface of the computer device.

23. The apparatus of claim 22, wherein the user interface having the selectable financial instruments includes CUSIP information.

24. The apparatus of claim 22, wherein the user interface having the selectable financial instruments includes coupon rate information.

25. The apparatus of claim 22, wherein the user interface having the selectable financial instruments includes maturity information.

26. The apparatus of claim 20, wherein the instructions to automatically generate the pool of long positions that will take delivery of the short positions associated with the aggregated short position delivery intents further comprise instructions to:
   determine a trading volume assigned to each trading date for each exchange member;
   group long positions by trading date; and
   add long positions for each trading date to the pool of long positions until the total long positions satisfy the total short positions.

27. The apparatus of claim 26, wherein the instructions to determine the trading volume assigned to each trading date for each exchange member comprise instructions to:
   sort a set of determined volume associated with long positions by trading date; and
   select, starting with a latest trading date, each trading date sequentially until the long position for that member has been satisfied.

28. The apparatus of claim 20, further comprising instructions to:
   match deliveries with buyers in the pool of long positions.

29. A non-transitory computer-readable storage medium storing processor-issuable-and-generated instructions that, when issued, cause at least one processor to:
   receive, by a dynamic transaction management and clearing (DTMC) engine, from one or more data sources over a network, contract purchase details for contract purchases, a contract (i) having a specified term and (ii) trading on an exchange, the purchase details comprising position volume and purchase volume, for each of a plurality of exchange members associated with an exchange, for each of a plurality of trading dates throughout the specified term,
   said DTMC engine communicatively coupled to said one or more data sources and at least one computer device, said DTMC engine comprising one or more components instantiated on a single node or across numerous nodes of the network to improve performance through at least one of load-balancing and data-processing techniques;
   record, by the DTMC engine, contract purchase details;
   receive, by the DTMC engine over the network via an interaction gateway, one or more short position delivery intents from the at least one computer device associated with at least one exchange member among the plurality of exchange members having short positions;
   in response to receiving the one or more short position delivery intents, automatically generate, by a user interface module of the DTMC engine, a user interface that is displayed on the at least one computer device associated with the at least one exchange member, the user interface comprising selectable financial instruments available for delivery, the selectable financial instruments corresponding to financial instruments held by a post-trade financial services entity and associated with a contract for the respective exchange member;
   receive, by the DTMC engine, via the user interface from the at least one computer device, a selection indicating an instrument nomination from among the selectable financial instruments for each received short position delivery intent, the instrument nomination specifying a financial instrument that is to be delivered by a respective associated exchange member;
   automatically aggregate, by the DTMC engine, received short position delivery intents to create aggregated short position delivery intents;
   automatically generate, by the DTMC engine, a pool of long positions that will take delivery of short positions associated with the aggregated short position delivery intents;
   automatically generate, by the DTMC engine, a delivered positions record comprising details for the short positions associated with the aggregated short position delivery intents, the pool of long positions that will take delivery and the instrument nomination, the DTMC engine transmitting the delivered positions record to the post-trade financial services entity;
   utilize, by the DTMC engine, the delivered positions record to effectuate delivery of the short positions and the pool of long positions; and
   automatically generate, by the DTMC engine, one or more trades based on the generated delivered positions record.

* * * * *